US012416875B2

(12) United States Patent
Ikeda et al.

(10) Patent No.: US 12,416,875 B2
(45) Date of Patent: Sep. 16, 2025

(54) ELECTROSTATIC CHARGE IMAGE DEVELOPING TONER, ELECTROSTATIC CHARGE IMAGE DEVELOPER, TONER CARTRIDGE, PROCESS CARTRIDGE, AND IMAGE FORMING APPARATUS

(71) Applicant: FUJIFILM Business Innovation Corp., Tokyo (JP)

(72) Inventors: Masashi Ikeda, Minamiashigara (JP); Yuka Ishihara, Minamiashigara (JP); Akira Matsumoto, Minamiashigara (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 1066 days.

(21) Appl. No.: 17/404,706

(22) Filed: Aug. 17, 2021

(65) Prior Publication Data

US 2022/0373914 A1 Nov. 24, 2022

(30) Foreign Application Priority Data

May 24, 2021 (JP) ................................ 2021-087061

(51) Int. Cl.
*G03G 21/16* (2006.01)
*G03G 9/08* (2006.01)
(Continued)

(52) U.S. Cl.
CPC ....... *G03G 9/09371* (2013.01); *G03G 9/0819* (2013.01); *G03G 9/09328* (2013.01);
(Continued)

(58) Field of Classification Search
CPC ............ G03G 9/0819; G03G 9/08755; G03G 9/09328; G03G 9/09364; G03G 9/09371;
(Continued)

(56) References Cited

U.S. PATENT DOCUMENTS 10,082,742 B2 * 9/2018 Matsumoto .......... G03G 9/0804
2005/0074685 A1 4/2005 Kido et al.
(Continued)

FOREIGN PATENT DOCUMENTS

EP 3214498 A1 9/2017
JP 2003-084478 A 3/2003
(Continued)

OTHER PUBLICATIONS

Feb. 14, 2022 Extended European Search Report issued in European Patent Application No. 21195261.9.

*Primary Examiner* — Hoang X Ngo
(74) *Attorney, Agent, or Firm* — Oliff PLC

(57) ABSTRACT

An electrostatic charge image developing toner contains: a toner particle including a core portion containing a binder resin and a release agent that has a melting temperature Tm of 80° C. or less, and a coating layer that coats the core portion and contains an amorphous polyester resin, and the toner particle has a cross section in which one or more and three or less domains of the release agent are present in the core portion, the one or more and three or less domains having a circle-equivalent diameter of 1 μm or more and 3 μm or less, the toner particle has a volume average particle diameter of 4.2 μm or more and 5.8 μm or less, and a ratio of a thickness of the coating layer to a maximum diameter of the toner particle is 1% or more and 25% or less in the cross section.

20 Claims, 3 Drawing Sheets

(51) Int. Cl.
*G03G 9/093* (2006.01)
*G03G 9/097* (2006.01)
*G03G 15/08* (2006.01)
*G03G 21/18* (2006.01)

(52) U.S. Cl.
CPC ..... *G03G 9/09364* (2013.01); *G03G 9/09775* (2013.01); *G03G 9/09791* (2013.01); *G03G 15/08* (2013.01); *G03G 21/1814* (2013.01)

(58) Field of Classification Search
CPC ........... G03G 9/09775; G03G 9/09791; G03G 15/08; G03G 21/1814
See application file for complete search history.

(56) References Cited

U.S. PATENT DOCUMENTS

| | | | | |
|---|---|---|---|---|
| 2015/0268574 | A1* | 9/2015 | Miyaake ............ | C08G 18/4238 525/440.16 |
| 2020/0310270 | A1 | 10/2020 | Nakashima et al. | |

FOREIGN PATENT DOCUMENTS

| | | | |
|---|---|---|---|
| JP | 2007-057764 | A | 3/2007 |
| JP | 2011-149986 | A | 8/2011 |
| JP | 2015-011304 | A | 1/2015 |

* cited by examiner

ELECTROSTATIC CHARGE IMAGE DEVELOPING TONER, ELECTROSTATIC CHARGE IMAGE DEVELOPER, TONER CARTRIDGE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2021-087061 filed on May 24, 2021.

BACKGROUND

(i) Technical Field

The present invention relates to an electrostatic charge image developing toner, an electrostatic charge image developer, a toner cartridge, a process cartridge, and an image forming apparatus.

(ii) Related Art

JP-A-2003-084478 discloses an "electrostatic charge image developing toner containing a binder resin, colorants, a release agent and external additives, in which a volume average particle diameter of the toners is 5.0 to 7.0 μm; the content percentage of the toner particles having a particle diameter of 5.08 μm or less is 16 to 50 number %; the content percentage of the toner particles having a particle diameter of 5.08 to 7.92 μm is 50 to 80 number %; the content percentage of the toner particles having a particle diameter of 15.4 μm or more is ≤0.1 vol. %; and a ratio (N/V) of the number % (N) of the toner particles having a particle diameter of 5.08 μm or less to the volume % (V) of the toner particles having a particle diameter of 5.08 μm or less is 1.2 to 3.0".

JP-A-2011-149986 discloses an "electrostatic charge image developing toner has a core-shell structure including a core layer containing an amorphous resin and a colorant and a shell layer coating the core layer, in which the shell layer contains composite resin particles containing a crystalline polyester resin and an amorphous resin".

JP-A-2015-011304 discloses an "electrostatic charge image developing toner composed of toner particles having a core-shell structure in which the surface of core particles is coated with a shell layer, the core particles contain a crystalline polyester resin; the shell layer contains a vinyl resin and release agent; and a mass ratio between the crystalline polyester resin and vinyl resin is 95:5 to 60:40".

SUMMARY

Aspects of non-limiting embodiments of the present disclosure relate to an electrostatic charge image developing toner including a toner particle including a core portion containing a binder resin and a release agent that has a melting temperature Tm of 80° C. or less, and a coating layer that coats the core portion and contains an amorphous polyester resin, in which a volume average particle diameter of the toner particle is 4.2 μm or more and 5.8 μm or less. As compared with a case where the toner particle has a cross section in which 0 or more than three domains of the release agent having a circle-equivalent diameter of 1 μm or more and 3 μm or less are present in the core portion, or a case where a ratio of a thickness of the coating layer to a maximum diameter of the toner particle is less than 1% or more than 25% in the cross section, the electrostatic charge image developing toner may prevent adhesion (non-visual offset) of the toner to a fixing member when an image having a low image density is formed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrostatic charge image developing toner containing:

a toner particle including a core portion containing a binder resin and a release agent that has a melting temperature Tm of 80° C. or less, and a coating layer that coats the core portion and contains an amorphous polyester resin, and the toner particle has a cross section in which one or more and three or less domains of the release agent are present in the core portion, the one or more and three or less domains having a circle-equivalent diameter of 1 μm or more and 3 μm or less, the toner particle has a volume average particle diameter of 4.2 μm or more and 5.8 μm or less, and a ratio of a thickness of the coating layer to a maximum diameter of the toner particle is 1% or more and 25% or less in the cross section.

BRIEF DESCRIPTION OF THE DRAWINGS

Exemplary embodiment(s) of the present invention will be described in detail based on the following figures, wherein.

DETAILED DESCRIPTION

Figure 1:
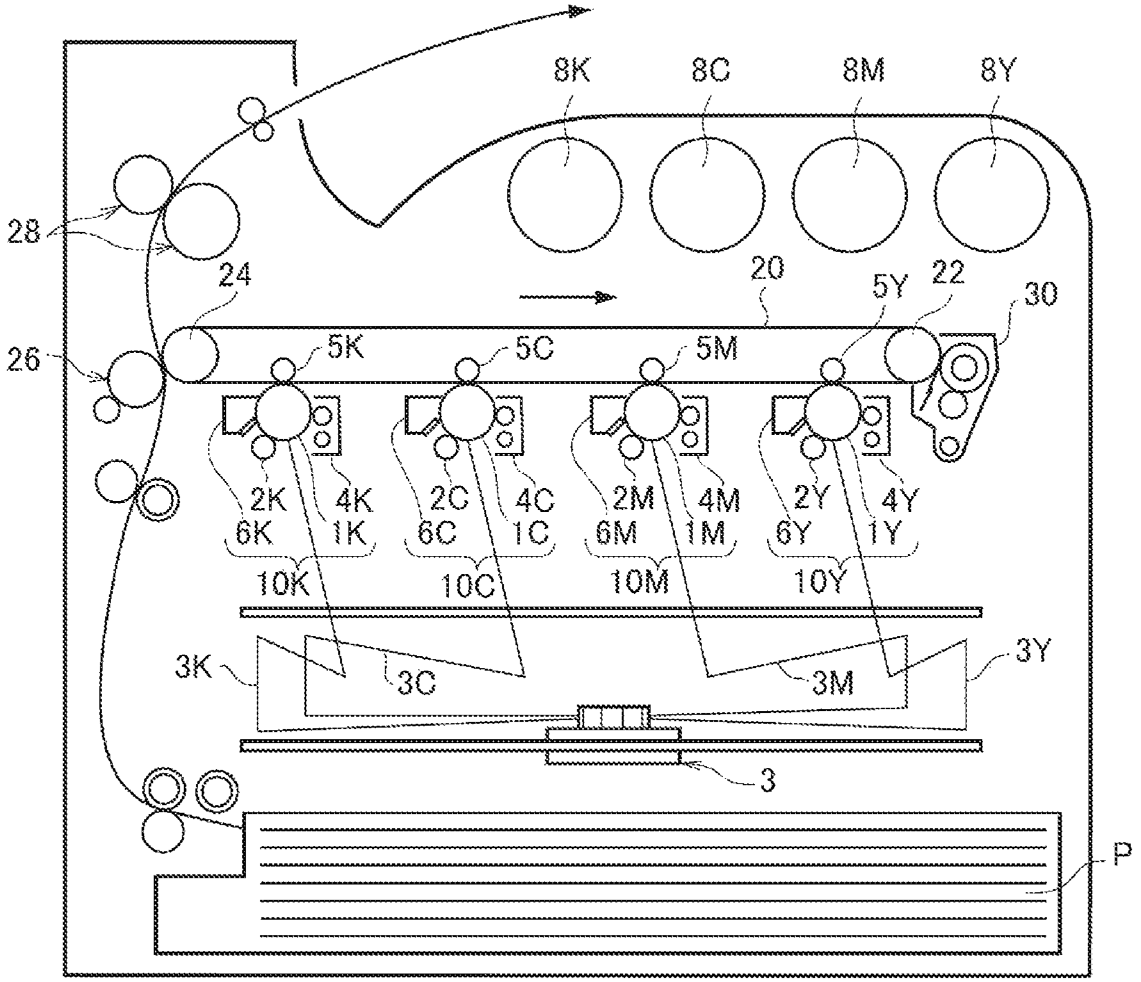
FIG. 1 is a schematic configuration diagram illustrating an example of an image forming apparatus according to the present exemplary embodiment.

Hereinafter, an exemplary embodiment which is an example of the present invention will be described in detail.

In numerical ranges described in stages, an upper limit or a lower limit described in a certain numerical range may be replaced with an upper limit or a lower limit of a numerical range described in other stages.

In the numerical ranges, the upper limit or the lower limit described in the certain numerical range may be replaced with values illustrated in Examples.

Referring to the amount of each component in the composition, when there are plural substances corresponding to each component in the composition, unless otherwise specified, it refers to the total amount of the plural substances present in the composition.

The term "step" indicates not only an independent step, and even when a step cannot be clearly distinguished from other steps, this step is included in the term "step" as long as the intended purpose of the step is achieved.

Each component may contain plural kinds of corresponding substances.

In a case of referring to the amount of each component in the composition, when there are plural kinds of substances corresponding to each component in the composition, unless otherwise specified, it refers to the total amount of the plural kinds of substances present in the composition.

The term "alkali metal element" refers to Li, Na, K, Rb, Cs, and Fr.

The term "alkaline earth metal element" refers to Be, Mg, Ca, Sr, Ba, and Ra.

<Electrostatic Charge Image Developing Toner>

An electrostatic charge image developing toner (hereinafter, also referred to as a "toner") according to the present exemplary embodiment includes toner particle containing a binder resin and a release agent having a melting temperature Tm of 80° C. or less, and the toner particle includes a core portion and a coating layer that coats the core portion and contains an amorphous polyester resin.

The toner particle has a cross section, in which one or more and three or less domains of the release agent having a circle-equivalent diameter of 1 μm or more and 3 μm or less are present in the core portion, a volume average particle diameter of the toner particle is 4.2 μm or more and 5.8 μm or less, and a ratio of a thickness of the coating layer to a maximum diameter of the toner particle is 1% or more and 25% or less in the cross section.

With the above-described configuration, the toner according to the present exemplary embodiment prevents adhesion of the toner to a fixing member when an image having a low image density (for example, an image density of 20% or less) is formed. The reasons are presumed as follows.

In recent years, improvement in image resolution is required, and in order to meet the demand, a toner having a small particle diameter (for example, the volume average particle diameter of the toner particle is 4.2 μm or more and 5.8 μm or less) may be used. However, when an image having a low image density is formed, a toner having a small particle diameter is likely to adhere to the fixing member, and image defects such as blurring of the image are likely to occur. In the case of forming an image having a low image density, when a toner having a small particle diameter is transferred to a recording medium, an amount of the isolated toner may increase. Then, in the subsequent fixing process, the isolated toner tends to be less likely to be fixed to the recording medium than a toner being adjacent to the other toner, and therefore, the toner is likely to adhere to a fixing member side. Then, the image defects such as blurring of the image is likely to occur.

In the toner according to the present exemplary embodiment, the toner particle includes the core portion and the coating layer that coats the core portion and contains an amorphous polyester resin. The ratio of the thickness of the coating layer to the maximum diameter of the toner particle is 1% or more and 25% or less in the cross section of the toner particle. A melting temperature of the amorphous polyester resin tends to be low. When the thickness of the coating layer containing the amorphous polyester resin is within the above range, the toner easily melts at the time of fixing and easily permeates into the recording medium.

In the toner according to the present exemplary embodiment, the toner particle includes a release agent having a melting temperature Tm of 80° C. or less in the core portion. In addition, one or more and three or less domains of the release agent having a circle-equivalent diameter of 1 μm or more and 3 μm or less are present in the core portion of the toner particle. When the domain of the release agent in the core portion of the toner particle is set as described above, the release agent is more easily exuded at the time of fixing to the recording medium, so that the adhesion of the toner to the fixing member is prevented. When the release agent having the melting temperature is contained, plasticity of the release agent is improved, and the release agent is easily spread on a surface of the fixing member at the time of fixing. Therefore, the adhesion of the toner to the fixing member is further prevented.

Based on the above, it is presumed that the toner according to the present exemplary embodiment may prevent the adhesion of the toner to the fixing member when an image having a low image density is formed.

(Toner Particle)

The toner particle contains a binder resin and a release agent having a melting temperature Tm of 80° C. or less.

The toner particle includes a core portion containing a binder resin and a release agent having a melting temperature Tm of 80° C. or less, and a coating layer that coats the core portion and contains an amorphous polyester resin.

—Core Portion—

The core portion contains a binder resin, a release agent having a melting temperature Tm of 80° C. or less, and, if necessary, a colorant and other additives.

—Binder Resin—

Examples of the binder resin include vinyl resins composed of homopolymers of monomers such as styrenes (such as styrene, parachlorostyrene, and α-methylstyrene), (meth) acrylates (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene), or copolymers obtained by combining two or more of these monomers.

Examples of the binder resin include a non-vinyl resin such as an epoxy resin, a polyester resin, a polyurethane resin, a polyamide resin, a cellulose resin, a polyether resin, and a modified resin, a mixture of the non-vinyl resin and the vinyl resin, and a graft polymer obtained by polymerizing a vinyl monomer in the presence of the non-vinyl resin and the vinyl resin.

These binder resins may be used alone or in combination of two or more thereof.

Examples of the binder resin include an amorphous resin and a crystalline resin.

The "crystalline" of a resin refers to having a clear endothermic peak in differential scanning calorimetry (DSC), not a stepwise change in endothermic amount, and specifically refers to that the half-value width of the endothermic peak when measured at a temperature rising rate of 10 (° C./min) is within 15° C.

On the other hand, the "amorphous" of a resin refers to that the half-value width is larger than 15° C., that the endothermic amount changes stepwise, or that no clear endothermic peak is observed.

The amorphous resin will be described.

Examples of the amorphous resin include known amorphous resins such as an amorphous polyester resin, an amorphous vinyl resin (such as a styrene acrylic resin), an epoxy resin, a polycarbonate resin, and a polyurethane resin. Among these, the amorphous polyester resin and the amorphous vinyl resin (particularly, a styrene acrylic resin) are preferred, and the amorphous polyester resin is more preferred.

It is also preferable to use an amorphous polyester resin and a styrene acrylic resin in combination as the amorphous resin.

It is also preferable to use an amorphous resin having an amorphous polyester resin segment and a styrene acrylic resin segment (hereinafter, also referred to as a "hybrid amorphous resin") as the amorphous resin.

Examples of the amorphous polyester resin include a polycondensate of a polycarboxylic acid and a polyhydric alcohol. As the amorphous polyester resin, a commercially available product or a synthesized product may be used.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenylsuccinic acid, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), and an anhydride or a lower alkyl ester (e.g., having 1 or more and 5 or less carbon atoms) thereof. Among these, the polycarboxylic acid is preferably, for example, an aromatic dicarboxylic acid.

As the polycarboxylic acid, a tricarboxylic or higher carboxylic acid having a cross-linked structure or a branched structure may be used in combination with a dicarboxylic acid. Examples of the tricarboxylic or higher carboxylic acid include trimellitic acid, pyromellitic acid, and an anhydride or a lower alkyl ester (such as having 1 or more and 5 or less carbon atoms) thereof.

The polycarboxylic acid may be used alone or in combination of two or more thereof.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as a bisphenol A ethylene oxide adduct and a bisphenol A propylene oxide adduct). Among these, the polyhydric alcohol is preferably, for example, an aromatic diol and an alicyclic diol, and more preferably an aromatic diol.

As the polyhydric alcohol, a trihydric or higher polyhydric alcohol having a cross-linked structure or a branched structure may be used in combination with a diol. Examples of the trihydric or higher polyhydric alcohol include glycerin, trimethylolpropane, and pentaerythritol.

The polyhydric alcohol may be used alone or in combination of two or more thereof.

The amorphous polyester resin is obtained by a well-known production method. Specifically, for example, the amorphous polyester resin may be obtained by a method in which the polymerization temperature is set to 180° C. or higher and 230° C. or lower, the pressure in the reaction system is reduced as necessary, and the reaction is performed while removing water and alcohol generated during the condensation.

When raw material monomers are insoluble or incompatible at the reaction temperature, a high boiling point solvent may be added as a dissolution assisting agent for dissolution. In this case, a polycondensation reaction is carried out while distilling off the dissolution assisting agent. When there is a poorly compatible monomer, it is preferable that the poorly compatible monomer is firstly condensed with an acid or alcohol to be polycondensed with the poorly compatible monomer and then the obtained product is polycondensed with the main component.

Here, examples of the amorphous polyester resin include a modified amorphous polyester resin in addition to the unmodified amorphous polyester resin described above. The modified amorphous polyester resin is an amorphous polyester resin in which a bonding group other than an ester bond is present, or an amorphous polyester resin in which a resin component different from the amorphous polyester resin component is bonded by a covalent bond, an ionic bond, or the like. Examples of the modified amorphous polyester resin include a resin in which an amorphous polyester resin having a functional group such as an isocyanate group that reacts with an acid group or a hydroxyl group at a terminal thereof is reacted with an active hydrogen compound to modify the terminal.

The styrene acrylic resin is a copolymer obtained by copolymerizing at least a styrene-based monomer (a monomer having a styrene skeleton) and a (meth) acryl-based monomer (a monomer having a (meth) acrylic group, preferably a monomer having a (meth) acryloxy group). The styrene acrylic resin includes, for example, a copolymer of a styrene monomer and a (meth) acrylic acid ester monomer.

An acrylic resin portion in the styrene acrylic resin has a partial structure formed by polymerizing one or both of the acryl-based monomer and a methacrylic-based monomer. "(meth) acryl" is an expression including both "acryl" and "methacryl".

Specific examples of the styrene-based monomer include styrene, alkyl-substituted styrenes (such as α-methyl styrene, 2-methyl styrene, 3-methyl styrene, 4-methylstyrene, 2-ethylstyrene, 3-ethylstyrene, and 4-ethylstyrene), halogen-substituted styrenes (such as 2-chlorostyrene, 3-chlorostyrene, and 4-chlorostyrene), and vinylnaphthalene. The styrene-based monomer may be used alone or in combination of two or more thereof.

Among these, the styrene-based monomer is preferably a styrene in terms of ease of reaction, ease of reaction control, and availability.

Specific examples of the (meth) acryl-based monomer include (meth) acrylic acid and (meth) acrylic ester. Examples of the (meth) acrylic ester include alkyl (meth) acrylate ester (such as methyl (meth) acrylate, ethyl (meth) acrylate, n-propyl (meth) acrylate, n-butyl (meth) acrylate, n-pentyl (meth) acrylate, n-hexyl (meth) acrylate, n-heptyl (meth) acrylate, n-octyl (meth) acrylate, n-decyl (meth) acrylate, n-dodecyl (meth) acrylate, n-lauryl (meth) acrylate, n-tetradecyl (meth) acrylate, n-hexadecyl (meth) acrylate, n-octadecyl (meth) acrylate, isopropyl (meth) acrylate, isobutyl (meth) acrylate, t-butyl (meth) acrylate, isopentyl (meth) acrylate, amyl (meth) acrylate, neopentyl (meth) acrylate, isohexyl (meth) acrylate, isoheptyl (meth) acrylate, isooctyl (meth) acrylate, 2-ethylhexyl (meth) acrylate, cyclohexyl (meth) acrylate, and t-butylcyclohexyl (meth) acrylate), aryl (meth) acrylate ester (such as phenyl (meth) acrylate, biphenyl (meth) acrylate, diphenylethyl (meth) acrylate, t-butylphenyl (meth) acrylate, and terphenyl (meth) acrylate), dimethylaminoethyl (meth) acrylate, diethylaminoethyl (meth) acrylate, methoxyethyl (meth) acrylate, 2-hydroxyethyl (meth) acrylate, β-carboxyethyl (meth) acrylate, and (meth) acrylamide. The (meth) acrylate-based monomers may be used alone or in combination of two or more thereof.

Among these (meth) acryl-based monomers, and among these (meth) acrylic esters, (meth) acrylate esters having an alkyl group having 2 to 14 carbon atoms (preferably 2 to 10 carbon atoms, and more preferably 3 to 8 carbon atoms) are preferable from a viewpoint of fixing property.

Among these, n-butyl (meth) acrylate is preferable, and n-butyl acrylate is particularly preferable.

A copolymerization ratio of the styrene-based monomer to the (meth) acryl-based monomer (based on mass, styrene-based monomer/(meth) acryl-based monomer) is not particularly limited, but is preferably 85/15 to 70/30.

The styrene acrylic resin may have a cross-linked structure. As the styrene acrylic resin having a cross-linked structure, for example, a styrene acrylic resin obtained by polymerizing at least a styrene-based monomer, a (meth) acrylate-based monomer, and a cross-linked monomer is preferably used.

Examples of the cross-linked monomer include two or more functional crosslinking agents.

Examples of the bifunction crosslinking agent include divinylbenzene, divinylnaphthalene, di (meth) acrylate compounds (such as diethylene glycol di (meth) acrylate, methylenebis (meth) acrylamide, decanediol diacrylate, and glycidyl (meth) acrylate), polyester di (meth) acrylate, and 2-([1'-methylpropylideneamino] carboxyamino) ethyl methacrylate.

Examples of the polyfunctional crosslinking agent include tri (meth) acrylate compounds (such as pentaerythritol tri (meth) acrylate, trimethylol ethane tri (meth) acrylate, and trimethylolpropane tri (meth) acrylate), tetra (meth) acrylate compounds (such as pentaerythritol tetra (meth) acrylate and oligoester (meth) acrylate), 2,2-bis (4-methacryloxy, polyethoxy phenyl) propane, diallyl phthalate, triallyl cyanurate, triallyl isocyanurate, triallyl trimellitate, and diaryl chlorendate.

From the viewpoint of preventing occurrence of image density decrease and occurrence of the image density unevenness, and from the viewpoint of the fixing property, among these, as the cross-linked monomer, a bifunction (meth) acrylate compound is preferable, a bifunction (meth) acrylate compound is more preferable, a bifunction (meth) acrylate compound having an alkylene group having 6 to 20 carbon atoms is still more preferable, and a bifunction (meth) acrylate compound having a linear alkylene group having 6 to 20 carbon atoms is particularly preferable.

A copolymerization ratio (based on mass, crosslinkable monomer/total monomer) of the cross-linked monomer to the total monomers is not particularly limited, but is preferably from 2/1,000 to 20/1,000.

A method for producing the styrene acrylic resin is not particularly limited, and various polymerization methods (such as solution polymerization, precipitation polymerization, suspension polymerization, bulk polymerization, emulsion polymerization, and the like) are applied. As a polymerization reaction, a known operation (such as a batch type, a semi-continuous type, a continuous type, or the like) is applied.

•Hybrid Amorphous Resin

The hybrid amorphous resin is an amorphous resin in which the amorphous polyester resin segment and the styrene acrylic resin segment are chemically bonded.

Examples of the hybrid amorphous resin include a resin having a main chain made of a polyester resin and a side chain made of a styrene acrylic resin chemically bonded to the main chain; a resin having a main chain made of a styrene acrylic resin and a side chain made of a polyester resin chemically bonded to the main chain; a resin having a main chain formed by chemical bonding of a polyester resin and a styrene acrylic resin; and a resin having a main chain formed by chemical bonding of a polyester resin and a styrene acrylic resin, and at least one side chain of a side chain made of a polyester resin chemically bonded to the main chain and a side chain made of a styrene acrylic resin chemically bonded to the main chain.

The amorphous polyester resin and the styrene acrylic resin of each segment are as described above, and the description thereof is omitted.

A total amount of the polyester resin segment and the styrene acrylic resin segment in the entire hybrid amorphous resin is preferably 80% by mass or more, more preferably 90% by mass or more, still more preferably 95% by mass or more, and still more preferably 100% by mass.

In the hybrid amorphous resin, a proportion of the styrene acrylic resin segment in the total amount of the polyester resin segment and the styrene acrylic resin segment is preferably 20% by mass or more and 60% by mass or less, more preferably 25% by mass or more and 55% by mass or less, and still more preferably 30% by mass or more and 50% by mass or less.

The hybrid amorphous resin can be produced by any of the following methods (i) to (iii). (i) After producing the polyester resin segment by condensation polymerization of the polyhydric alcohol and the polycarboxylic acid, the monomer constituting the styrene acrylic resin segment is subjected to addition polymerization. (ii) After the styrene acrylic resin segment is produced by addition polymerization of an addition polymerizable monomer, the polyhydric alcohol and the polycarboxylic acid are subjected to the condensation polymerization. (iii) The condensation polymerization of the polyhydric alcohol and the polycarboxylic acid and the addition polymerization of the addition polymerizable monomer are performed in parallel.

A proportion of the hybrid amorphous resin to the total binder resin is preferably 60% by mass or more and 98% by mass or less, more preferably 65% by mass or more and 95% by mass or less, and still more preferably 70% by mass or more and 90% by mass or less.

A glass transition temperature (Tg) of the amorphous resin is preferably 50° C. or higher and 80° C. or lower, and more preferably 50° C. or higher and 65° C. or lower.

The glass transition temperature is obtained from a DSC curve obtained by differential scanning calorimetry (DSC), and is more specifically obtained by the "extrapolated glass transition onset temperature" of a method for obtaining the glass transition temperature described in JIS K 7121-1987 "Method for measuring transition temperature of plastics".

A weight average molecular weight (Mw) of the amorphous resin is preferably 5000 or more and 1000000 or less, and more preferably 7000 or more and 500000 or less.

A number average molecular weight (Mn) of the amorphous resin is preferably 2000 or more and 100000 or less. A molecular weight distribution Mw/Mn of the amorphous resin is preferably 1.5 or more and 100 or less, and more preferably 2 or more and 60 or less.

The weight average molecular weight and the number average molecular weight are measured by gel permeation chromatography (GPC). The molecular weight is measured by GPC by using a GPC HLC-8120GPC manufactured by Tosoh Corporation as a measurement device, a column TSKgel Super HM-M (15 cm) manufactured by Tosoh Corporation, and a THF solvent. The weight average molecular weight and the number average molecular weight are calculated based on the measurement result by using a molecular weight calibration curve prepared using a monodispersed polystyrene standard sample.

The crystalline resin will be described.

Examples of the crystalline resin include known crystalline resins such as crystalline polyester resins and crystalline vinyl resins (such as polyalkylene resins and long-chain alkyl (meth) acrylate resins). Among the above crystalline resins, the crystalline polyester resin is preferred.

Examples of the crystalline polyester resin include a polycondensate of a polycarboxylic acid and a polyhydric alcohol. As the crystalline polyester resin, a commercially available product or a synthesized product may be used.

Here, in order to easily form a crystal structure, the crystalline polyester resin is preferably a polycondensate using a polymerizable monomer having a linear aliphatic group rather than a polymerizable monomer having aromatic series.

Examples of the polycarboxylic acid include aliphatic dicarboxylic acids (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (such as dibasic acids such as phthalic acid, isophthalic acid, terephthalic acid, and naphthalene-2,6-dicarboxylic acid), and an anhydride or a lower alkyl ester (such as having 1 or more and 5 or less carbon atoms) thereof.

As the polycarboxylic acid, a tricarboxylic or higher carboxylic acid having a cross-linked structure or a branched structure may be used in combination with a dicarboxylic acid. Examples of the tricarboxylic acid include aromatic carboxylic acids (such as 1,2,3-benzenetricarboxylic acid, 1,2,4-benzenetricarboxylic acid, and 1,2,4-naphthalenetricarboxylic acid), and an anhydride or a lower alkyl ester (such as having 1 or more and 5 or less carbon atoms) thereof.

As the polycarboxylic acid, a dicarboxylic acid having a sulfonic acid group or a dicarboxylic acid having an ethylenic double bond may be used in combination with these dicarboxylic acids.

The polycarboxylic acid may be used alone or in combination of two or more thereof.

Examples of the polyhydric alcohol include aliphatic diols (such as a linear aliphatic diol having 7 or more and 20 or less carbon atoms in the main chain portion). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanediol. Among these, the aliphatic diol is preferably 1,8-octanediol, 1,9-nonanediol, and 1,10-decanediol.

As the polyhydric alcohol, a trihydric or higher alcohol having a cross-linked structure or a branched structure may be used in combination with a diol. Examples of the trihydric or higher polyhydric alcohol include glycerin, trimethylolethane, trimethylolpropane, and pentaerythritol.

The polyhydric alcohol may be used alone or in combination of two or more thereof.

Here, the polyhydric alcohol preferably has an aliphatic diol content of 80 mol % or more, and preferably 90 mol % or more.

The crystalline polyester resin can be obtained by, for example, a known production method same as the amorphous polyester resin.

A melting temperature of the crystalline resin is preferably 50° C. or higher and 100° C. or lower, more preferably 55° C. or higher and 90° C. or lower, and still more preferably 60° C. or higher and 85° C. or lower.

The melting temperature is obtained from the DSC curve obtained by differential scanning calorimetry (DSC) according to the "melting peak temperature" of a method for obtaining the melting temperature described in JIS K 7121-1987 "Method for measuring transition temperature of plastics".

A weight average molecular weight (Mw) of the crystalline resin is preferably 6,000 or more and 35,000 or less.

The crystalline polyester resin is preferably a polymer of an α, ω-linear aliphatic dicarboxylic acid and an α, ω-linear aliphatic diol.

The α, ω-linear aliphatic dicarboxylic acid is preferably an α, ω-linear aliphatic dicarboxylic acid in which an alkylene group connecting two carboxyl groups has 3 to 14 carbon atoms, more preferably 4 to 12 carbon atoms, and still more preferably 6 to 10 carbon atoms.

Examples of the α, ω-linear aliphatic dicarboxylic acid include succinic acid, glutaric acid, adipic acid, 1,6-hexane dicarboxylic acid (commonly used name suberic acid), 1,7-heptane dicarboxylic acid (commonly used name azelaic acid), 1,8-octane dicarboxylic acid (commonly used name sebacic acid), 1,9-nonane dicarboxylic acid, 1,10-decane dicarboxylic acid, 1,12-dodecane dicarboxylic acid, 1,14-tetradecane dicarboxylic acid, and 1,18-octadecane dicarboxylic acid. Among these, 1,6-hexane dicarboxylic acid, 1,7-heptane dicarboxylic acid, 1,8-octane dicarboxylic acid, 1,9-nonane dicarboxylic acid, and 1,10-decane dicarboxylic acid are preferable.

The α, ω-linear aliphatic dicarboxylic acid may be used alone or in combination of two or more thereof.

The α, ω-linear aliphatic diol is preferably an α, ω-linear aliphatic diol in which an alkylene group connecting two hydroxy groups has 3 to 14 carbon atoms, more preferably 4 to 12 carbon atoms, and still more preferably 6 to 10 carbon atoms.

Examples of the α, ω-linear aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,14-tetradecanediol, and 1,18-octadecanediol. Among these, 1,6-hexanediol, 1,7-heptanediol, 1,8-octanediol, 1,9-nonanediol, and 1,10-decanediol are preferable.

The α, ω-linear aliphatic diol may be used alone or in combination of two or more thereof.

The polymer of an α, ω-linear aliphatic dicarboxylic acid and an α, ω-linear aliphatic diol is preferably a polymer of at least one selected from a group consisting of 1,6-hexane dicarboxylic acid, 1,7-heptane dicarboxylic acid, 1,8-octane dicarboxylic acid, 1,9-nonane dicarboxylic acid, and 1,10-decane dicarboxylic acid and at least one selected from a group consisting of 1,6-hexanediol, 1,7-heptanediol, 1,8-octanediol, 1,9-nonanediol, and 1,10-decanediol. Among these, the polymer of an α, ω-linear aliphatic dicarboxylic acid and an α, ω-linear aliphatic diol is more preferably a polymer of 1,10-decane dicarboxylic acid and 1,6-hexanediol.

The binder resin preferably contains a styrene acrylic resin, a crystalline polyester resin, and an amorphous polyester resin.

When the binder resin contains the above resin, a phenomenon in which viscoelasticity of the toner at the time of fixing the toner becomes too high or too low is easily prevented. Therefore, the toner is more easily fixed to the recording medium at the time of fixing the toner, and the adhesion of the toner to the fixing member is further prevented.

Here, as the binder resin contained in the toner particle, a styrene acrylic resin, a crystalline polyester resin, and an amorphous polyester resin are preferably contained in the following amounts.

Styrene acrylic resin: The content thereof is preferably 50 mass % or more and 90 mass % or less, more preferably 55 mass % or more and 85 mass % or less, and still more preferably 60 mass % or more and 70 mass % or less, with respect to the total toner particle.

Crystalline polyester resin: The content thereof is preferably 9.5 mass % or more and 40 mass % or less, more preferably 15 mass % or more and 35 mass % or less, and still more preferably 20 mass % or more and 30 mass % or less, with respect to the total toner particle.

Amorphous polyester resin of the core portion and amorphous polyester resin of the coating layer: The content thereof is preferably 0.5 mass % or more and 5 mass % or less, more preferably 1.5 mass % or more and 4 mass % or less, and still more preferably 2.0 mass % or more and 3 mass % or less, with respect to the total toner particle.

By setting the content of the binder resin within the above range, the phenomenon in which the viscoelasticity of the toner at the time of fixing the toner becomes too high or too low is easily further prevented. Therefore, the toner is more easily fixed to the recording medium at the time of fixing the toner, and the adhesion of the toner to the fixing member is further prevented.

The content of the binder resin contained in the core portion is, for example, preferably 40 mass % or more and 95 mass % or less, more preferably 50 mass % or more and 90 mass % or less, and still more preferably 60 mass % or more and 85 mass % or less, with respect to the total toner particle.

—Colorant—

Examples of the colorant include various pigments such as Carbon Black, Chrome Yellow, Hansa Yellow, Benzidine Yellow, Threne Yellow, Quinoline Yellow, Pigment Yellow, Permanent Orange GTR, Pyrazolone Orange, Vulcan Orange, Watchung Red, Permanent Red, Brilliant Carmine 3B, Brilliant Carmine 6B, DuPont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The colorants may be used alone or in combination of two or more thereof.

As the colorant, a surface-treated colorant may be used as necessary, or the colorant may be used in combination with a dispersant. Plural kinds of colorants may be used in combination.

The content of the colorant is, for example, preferably 1 mass % or more and 30 mass % or less, more preferably 3 mass % or more and 15 mass % or less, still more preferably 5 mass % or more and 12 mass % or less, and most preferably 7 mass % or more and 10 mass % or less, with respect to the total toner particle.

By setting the content of the colorant to 12 mass % or less, even when an image having a low image density is formed, an applied amount of the toner increases, and thus the isolated toner tends to be reduced at the time of transferring to the recording medium. Therefore, in the fixing step, the toner is easily fixed to the recording medium, and the adhesion of the toner to the fixing member is prevented.

In addition, in a case where the applied amount of the toner is too large, the toner adheres to the fixing member, and by setting the content of the colorant to 5 mass % or more, it is possible to prevent the applied amount of the toner from becoming too large.

—Release Agent—

Examples of the release agent include hydrocarbon wax, natural wax such as carnauba wax, rice wax, and candelilla wax, synthetic or mineral/petroleum wax such as montan wax, and ester wax such as fatty acid ester and montanic acid ester. The release agent is not particularly limited thereto.

The melting temperature Tm of the release agent is 80° C. or less.

From a viewpoint of further preventing the adhesion of the toner to the fixing member, the melting temperature Tm is preferably 20° C. or more and 75° C. or less, and more preferably 30° C. or more and 70° C. or less.

The melting temperature is obtained from the DSC curve obtained by differential scanning calorimetry (DSC) according to the “melting peak temperature” of a method for obtaining the melting temperature described in JIS K 7121-1987 “Method for measuring transition temperature of plastics”.

A content of the release agent is preferably, for example, 1 mass % or more and 20 mass % or less, and more preferably 5 mass % or more and 15 mass % or less, based on the total toner particle.

—Other Additives—

Examples of the other additives include known additives such as a magnetic body, an electrostatic charge control agent, and an inorganic powder.

Examples of other additives also include an alkali metal element supply source and an alkaline earth metal element supply source. These additives are contained in the toner particle as internal additives.

—Alkali Metal Element Supply Source—

Examples of the alkali metal element supply source include an additive containing an alkali metal element (such as a surfactant and an aggregating agent). Specific examples of the additive containing an alkali metal element include a salt containing an alkali metal element.

Examples of the salt containing an alkali metal element include: a salt containing a lithium element, such as lithium chloride, lithium sulfate, and lithium nitrate; a salt containing a sodium element, such as sodium chloride, sodium sulfate, and sodium nitrate; a salt containing a potassium element, such as potassium chloride, potassium sulfate, and potassium nitrate; a salt containing a rubidium element, such as rubidium chloride, rubidium sulfate, and rubidium nitrate; a salt containing a cesium element, such as cesium chloride, cesium sulfate, and cesium nitrate; and a salt containing a francium element, such as francium chloride, francium sulfate, and francium nitrate.

Examples of the salt containing an alkali metal element also include a salt containing an alkali metal sulfonate element (such as sodium alkylbenzene sulfonate such as sodium dodecylbenzene sulfonate).

—Alkaline Earth Metal Element Supply Source—

Examples of the alkaline earth metal element supply source include an additive containing an alkaline earth metal element (such as a surfactant and an aggregating agent). Specific examples of the additive containing an alkaline earth metal element include a salt containing an alkaline earth metal element.

Specific examples of the salt containing an alkaline earth metal element include: a salt containing a beryllium element such as beryllium chloride, beryllium sulfate, and beryllium nitrate; a salt containing a magnesium element such as magnesium chloride, magnesium sulfate, and magnesium nitrate; a salt containing a calcium element such as calcium chloride, calcium sulfate, and calcium nitrate; a salt containing a strontium element such as strontium chloride, strontium sulfate, and strontium nitrate; a salt containing a barium element such as barium chloride, barium sulfate, and barium nitrate; and a salt containing a radium element such as radium chloride, radium sulfate, and radium nitrate.

Examples of the salt containing an alkaline earth metal element include a salt containing an alkaline earth metal sulfonate element (such as calcium alkylbenzene sulfonate such as calcium dodecylbenzene sulfonate) and a metal sulfide salt (such as calcium polysulfide).

The salt containing an alkali metal element is preferably a salt containing a sodium element such as sodium chloride, sodium sulfate, or sodium nitrate.

The salt containing an alkaline earth metal element is preferably a salt containing a magnesium element such as magnesium chloride, magnesium sulfate, or magnesium nitrate, or a salt containing a calcium element such as calcium chloride, calcium sulfate, or calcium nitrate, and more preferably a salt containing a magnesium element such as magnesium chloride, magnesium sulfate, or magnesium nitrate.

A total content of the alkali metal element supply source and the alkaline earth metal element supply source in the toner particle is preferably added such that the Net intensity $N_A$ is 0.10 kcps or more and 0.40 kcps or less.

—Coating Layer—

The coating layer contains an amorphous polyester resin as a binder resin.

Here, the amorphous polyester resin contained in the coating layer is the same as the amorphous polyester resin contained in the core portion (core particle).

The coating layer may contain a resin other than the amorphous polyester resin.

Examples of the other resin contained in the coating layer include vinyl resins composed of homopolymers of monomers such as styrenes (such as styrene, parachlorostyrene, and α-methylstyrene), (meth)acrylates (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene), or copolymers obtained by combining two or more of these monomers.

Examples of the other resin contained in the coating layer include a non-vinyl resin such as an epoxy resin, a crystalline polyester resin, a polyurethane resin, a polyamide resin, a cellulose resin, a polyether resin, and a modified resin, a mixture of the non-vinyl resin and the vinyl resin, and a graft polymer obtained by polymerizing a vinyl monomer in the presence of the non-vinyl resin and the vinyl resin.

Furthermore, the binder resin described for the core portion may be contained.

The content of the amorphous polyester resin in the binder resin contained in the coating layer is, for example, preferably 80 mass % or more and 100 mass % or less, more preferably 85 mass % or more and 99 mass % or less, and still more preferably 90 mass % or more and 98 mass % or less, with respect to the total binder resin contained in the coating layer.

The content of the binder resin contained in the coating layer is, for example, preferably 80 mass % or more and 100 mass % or less, more preferably 85 mass % or more and 99 mass % or less, and still more preferably 90 mass % or more and 98 mass % or less, with respect to the total coating layer.

The coating layer may contain, if necessary, a release agent, a colorant, and other additives.

Examples of the release agent, the colorant, and other additives are the same as those contained in the core portion.

(Properties of Toner Particle)

—Domain of Release Agent—

In the toner according to the present exemplary embodiment, the toner particle has the cross section, in which one or more and three or less domains of the release agent having a circle-equivalent diameter of 1 μm or more and 3 μm or less are present in the core portion.

From a viewpoint of further improving easiness of the exudation of the release agent at the time of fixing, the circle-equivalent diameter of the domains of the release agent is more preferably 1.2 μm or more and 2.8 μm or less, and still more preferably 1.4 μm or more and 2.6 μm or less.

The circle-equivalent diameter of the domains of the release agent and the number of the domains are measured by the following method.

The toner particles (or toner) are mixed and embedded in an epoxy resin, and the epoxy resin is solidified. The obtained solidified epoxy resin is cut by an ultramicrotome apparatus (Ultracut UCT manufactured by Leica) to prepare a thin sample having a thickness of 80 nm or more and 130 nm or less. Next, the obtained thin sample is dyed with ruthenium tetroxide in a desiccator at 30° C. for 3 hours. Then, an SEM image of the dyed thin sample is obtained by using an ultra-high resolution field emission-type scanning electron microscope (FE-SEM, S-4800 manufactured by Hitachi High-Technologies Corporation).

In the cross section of the toner particle, since a domain of a colorant is smaller than the domain of the release agent, the domain of the colorant and the domain of the release agent can be distinguished by the size. The domain of the colorant can also be distinguished by shading of the dyeing of the domain of the release agent. In the cross section of the toner particle, the core portion and the coating layer can be distinguished from each other by the shading of the dyeing.

In the SEM image, 30 cross sections of the toner particles in which the diameter of the cross sections of the toner particles is 85% or more of the volume average particle diameter of the toner particle are selected, and the circle-equivalent diameter of the domain of the dyed release agent present in the core portion is measured. Then, the number of domains of the dyed release agent having a circle-equivalent diameter of 1 μm or more and 3 μm or less is counted in the 30 cross sections of the toner particles and the number is divided by 30 to calculate the number of domains of the release agent present in the core portion.

—Volume Average Particle Diameter and Circularity—

In the toner according to the present exemplary embodiment, the volume average particle diameter of the toner particle is 4.2 μm or more and 5.8 μm or less.

The volume average particle diameter of the toner particle may be 4.4 μm or more and 5.6 μm or less, and may be 4.6 μm or more and 5.4 μm or less.

In the toner according to the present exemplary embodiment, a volume particle size distribution index at a small diameter side of the toner particle (referred as lower GSDv) is preferably 1.15 or more and 1.30 or less.

By setting the volume particle size distribution index at the small diameter side of the toner particle within the above range, an abundance proportion of fine toner particle is reduced, and scattering of the toner at the time of development and transferring is prevented. As a result, a proportion of the isolated toner on the recording medium is further reduced, and thus the adhesion of the toner to the fixing member is further prevented.

The volume particle size distribution index at the small diameter side of the toner particle (referred as lower GSDv) is more preferably 1.18 or more and 1.28 or less, and still more preferably 1.20 or more and 1.26 or less.

Various average particle diameters and various particle size distribution indexes of the toner particle are measured using a Coulter Multisizer II (manufactured by Beckman Coulter, Inc.) and the electrolytic solution is ISOTON-II (manufactured by Beckman Coulter, Inc.).

In the measurement, 0.5 mg or more and 50 mg or less of a measurement sample is added to 2 ml of a 5 mass % aqueous solution of a surfactant (preferably sodium alkylbenzenesulfonate) as a dispersant. The obtained mixture is added to 100 ml or more and 150 ml or less of the electrolytic solution.

The electrolytic solution in which the sample is suspended is subjected to a dispersion treatment for 1 minute with an ultrasonic disperser, and the Coulter Multisizer II is used to measure the particle diameter distribution of particles having a particle diameter in the range of 2 μm or more and 60 μm or less using an aperture having an aperture diameter of 100 μm. The number of the particles sampled is 50000.

A divided particle size range (channel) is set, and a volume-based particle size distribution and a number-based particle size distribution are measured. Then, cumulative distributions of the volume-based and the number-based particle size distributions are drawn from a small diameter side, and particle diameters at which a cumulative percentage is 16% are respectively defined as a volume particle diameter D16v and a number particle diameter D16p, particle diameters at which the cumulative percentage is 50% are defined as a volume average particle diameter D50v and a cumulative number average particle diameter D50p, and particle diameters at which the cumulative percentage is 84% are defined as a volume particle diameter D84v and a number particle diameter D84p.

Using these, the volume particle size distribution index (GSDv) is calculated as $(D84v/D16v)^{1/2}$, and the number particle size distribution index (GSDp) is calculated as $(D84p/D16p)^{1/2}$.

Then, using these values, the volume particle size distribution index at the small diameter side (referred as lower GSDv) is calculated as $(D50v/D16v)^{1/2}$.

An average circularity of the toner particle is preferably 0.94 or more and 1.00 or less, and more preferably 0.95 or more and 0.98 or less.

The average circularity of the toner particle is obtained according to (circle equivalent perimeter)/(perimeter) [(perimeter of circle having the same projected area as the particle image)/(perimeter of particle projection image)]. Specifically, the average circularity of the toner particle is a value measured by the following method.

First, the toner particles as measurement targets are sucked and collected to form a flat flow, and flash light is emitted instantly to capture a particle image as a still image. The particle image is determined by a flow type particle image analyzer (FPIA-3000 manufactured by Sysmex Corporation) for image analysis. The number of the toner particles sampled for determining the average circularity is 3500.

When the toner contains an external additive, the toner (developer) as a measurement target is dispersed in water containing a surfactant, and then an ultrasonic treatment is performed to obtain toner particles from which the external additive is removed.

—Ratio of Thickness of Coating Layer—

In the toner according to the present exemplary embodiment, the ratio of the thickness of the coating layer to the maximum diameter of the toner particle is 1% or more and 25% or less in the cross section of the toner particle.

From a viewpoint of further improving the penetration of the toner into the recording medium at the time of fixing, the ratio of the thickness of the coating layer to the maximum diameter of the toner particle is preferably 3% or more and 22% or less, more preferably 6% or more and 19% or less, and still more preferably 9% or more and 16% or less.

The ratio of the thickness of the coating layer to the maximum diameter of the toner particle is calculated as follows.

The toner particles (or toner) are mixed and embedded in an epoxy resin, and the epoxy resin is solidified. The obtained solidified epoxy resin is cut by an ultramicrotome apparatus (Ultracut UCT manufactured by Leica) to prepare a thin sample having a thickness of 80 nm or more and 130 nm or less. Next, the obtained thin sample is dyed with ruthenium tetroxide in a desiccator at 30° C. for 3 hours. Then, an SEM image of the dyed thin sample is obtained by using an ultra-high resolution field emission-type scanning electron microscope (FE-SEM, S-4800 manufactured by Hitachi High-Technologies Corporation).

In the cross section of the toner particle, the core portion and the coating layer can be distinguished from each other by the shading of the dyeing.

Then, in the SEM image, 10 cross sections of the toner particles in which the diameter of the cross sections of the toner particles is 85% or more of the volume average particle diameter of the toner particles are selected. Then, an arithmetic average diameter of the diameters of the selected cross sections of the toner particles is defined as the "maximum diameter of the toner particle". Here, the diameter of the cross section of the toner particle refers to a maximum length (so-called major axis) of a straight line through any two points on a contour line of the cross section of the toner particle.

Next, in the SEM image of the selected cross sections of the toner particle, a straight line having the maximum length among straight lines through any two points on the contour line of the cross section of the toner particle is drawn. The length between a point A at which the straight line intersects with the contour line of the cross section of the toner particle and a point B (which is present in the vicinity of the point A) at which the straight line intersects with a boundary line between the core portion and the coating layer is calculated. Then, an arithmetic average length of the lengths between the two points A and B calculated based on the cross sections of the toner particle is defined as the "thickness of the coating layer".

When the "thickness of the coating layer" is defined as 100, a proportion of the "maximum diameter of the toner particle" is defined as the "ratio of the thickness of the coating layer to the maximum diameter of the toner particle".

—Net Intensity—

In the toner particle, a Net intensity $N_A$ of a total of the alkali metal element and the alkaline earth metal element measured by fluorescence X-ray analysis is preferably 0.10 kcps or more and 0.40 kcps or less.

The alkali metal element and the alkaline earth metal element function as a crosslinking agent for the binder resin. By setting the Net intensity $N_A$ within the above range, the elements are appropriately contained in the toner particle, and the phenomenon in which the viscoelasticity of the toner at the time of fixing the toner becomes too high or too low is easily further prevented. Therefore, the toner is more easily fixed to the recording medium at the time of fixing the toner, and the adhesion of the toner to the fixing member is further prevented.

From the viewpoint of preventing the adhesion of the toner to the fixing member, the Net intensity $N_A$ is preferably 0.20 kcps or more and 0.60 kcps or less, and more preferably 0.40 kcps or more and 0.50 kcps or less.

The Net intensity $N_A$ of the alkali metal element and the alkaline earth metal element is calculated by measuring the Net intensity of the alkali metal element and the Net intensity of the alkaline earth metal element by the following method and summing the measured values.

A method of measuring the Net intensity of the alkali metal element and the Net intensity of the alkaline earth metal element is as follows.

About 0.12 g of the toner particles (or the toner including the toner particle and the external additive) is compressed by using a compression molding machine under a pressure of a load of 6 t for 60 seconds to prepare a disk having a diameter of 50 mm and a thickness of 2 mm. Using this disc as a sample, qualitative and quantitative element analysis is performed under the following conditions by using a scanning fluorescence X-ray analysis device (ZSX Primus II manufactured by Rigaku Corporation) to obtain the Net intensity (unit: kilo counts per second, kcps) of each of the alkali metal element and the alkaline earth metal element. Then, the Net intensity $N_A$ is calculated by summing the Net intensity of the alkali metal element and the Net intensity of the alkaline earth metal element.

Tube voltage: 40 kV
Tube current: 70 mA
Anticathode: rhodium
Measurement time: 15 minutes
Analysis diameter: 10 mm in diameter The Net intensity $N_A$ is preferably a Net intensity $N_N$ of Na element, a Net intensity $N_M$ of Mg element, or a Net intensity $N_C$ of Ca element measured by fluorescence X-ray analysis.

That is, in the toner according to the present exemplary embodiment, it is preferable that "the Net intensity $N_N$ of the Na element measured by fluorescence X-ray analysis is 0.10 kcps or more and 0.40 kcps or less", "the Net intensity $N_M$ of the Mg element measured by fluorescence X-ray analysis is 0.10 kcps or more and 0.40 kcps or less", or "the Net intensity $N_C$ of the Ca element measured by fluorescence X-ray analysis is 0.10 kcps or more and 0.40 kcps or less" in the toner particle.

Among the alkali metal element and the alkaline earth metal element, the Na element, the Mg element, and the Ca element tend to have a higher effect as a crosslinking agent. Therefore, by containing these elements in the toner particle in a manner that the Net intensity of these elements falls within the above range, the adhesion of the toner to the fixing member is further prevented.

From a viewpoint that the Mg element tends to have a higher effect as a crosslinking agent, and thus the adhesion of the toner to the fixing member is prevented, the Net intensity $N_A$ is preferably the Net intensity $N_M$ of the Mg element measured by fluorescence X-ray analysis.

That is, in the toner according to the present exemplary embodiment, the Net intensity $N_M$ of the Mg element in the toner particle measured by fluorescence X-ray analysis is preferably 0.10 kcps or more and 1.20 kcps or less.

Here, the Net intensity $N_N$ of the Na element, the Net intensity $N_M$ of the Mg element, and a Net intensity $N_C$ of a Ca element are measured in the same procedure as the method of measuring the Net intensity of the alkali metal element and the Net intensity of the alkaline earth metal element, except that the Net intensity $N_N$ of the Na element, the Net intensity $N_M$ of the Mg element, and the Net intensity $N_C$ of the Ca element are obtained in the qualitative and quantitative element analysis.

In order to set each Net within the above range, for example, an alkali metal element supply source or an alkaline earth metal element supply source is preferably contained in the toner particle.

(External Additive)

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, and $MgSO_4$.

Surfaces of the inorganic particles as other external additives are preferably subjected to a hydrophobic treatment. The hydrophobic treatment is performed, for example, by immersing the inorganic particles in a hydrophobic treatment agent. A hydrophobic treatment agent is not particularly limited. Examples of the hydrophobic treatment agent include a silane coupling agent, a silicone oil, a titanate coupling agent, and an aluminum coupling agent. The hydrophobic treatment agent may be used alone or in combination of two or more thereof.

An amount of the hydrophobic treatment agent is generally, for example, 1 part by mass or more and 10 parts by mass or less based on 100 parts by mass of the inorganic particles.

Examples of the external additive also include resin particles (resin particles of polystyrene, polymethylmethacrylate (PMMA), and melamine resin), and cleaning activators (such as fatty acid metal salt particles, and particle of fluoropolymer).

The toner in the present exemplary embodiment preferably contains a fatty acid metal salt particle as an external additive.

It is preferable that by the external additive containing the fatty acid metal salt particle, the adhesion of the toner to the fixing member is further prevented.

The fatty acid metal salt particle is a particle of a salt composed of a fatty acid and a metal.

The fatty acid may be either a saturated fatty acid or an unsaturated fatty acid. The number of carbon atoms of the fatty acid is 10 or more and 25 or less (preferably 12 or more and 22 or less). The number of carbon atoms of the fatty acid includes carbon atoms of a carboxyl group.

Specific examples of the fatty acid include saturated fatty acids such as behenic acid, stearic acid, palmitic acid, myristic acid, and lauric acid; and unsaturated fatty acids such as oleic acid, linoleic acid, and ricinoleic acid. Among these fatty acids, stearic acid and lauric acid are preferable, and stearic acid is more preferable.

As the metal, a divalent metal may be used. Specific examples of the metal include magnesium, calcium, aluminum, barium, and zinc. Among these, zinc is preferable.

Specific examples of the fatty acid metal salt particle include a particle of a stearic acid metal salt such as aluminum stearate, calcium stearate, potassium stearate, magnesium stearate, barium stearate, lithium stearate, zinc stearate, copper stearate, lead stearate, nickel stearate, strontium stearate, cobalt stearate, and sodium stearate; a particle of a palmitic acid metal salt such as zinc palmitate, cobalt palmitate, copper palmitate, magnesium palmitate, aluminum palmitate, and calcium palmitate; a particle of a lauric acid metal salt such as zinc laurate, manganese laurate, calcium laurate, iron laurate, magnesium laurate, and aluminum laurate; a particle of an oleic acid metal salt such as zinc oleate, manganese oleate, iron oleate, aluminum oleate, copper oleate, magnesium oleate, and calcium oleate; a particle of a linoleic acid metal salt such as zinc linoleate, cobalt linoleate, and calcium linoleate; and a particle of a ricinoleic acid metal salt such as zinc ricinoleate and aluminum ricinoleate.

Among these, as the fatty acid metal salt particle, in terms of cleanability and material availability, a particle of a stearic acid metal salt or a lauric acid metal salt is preferable, a particle of zinc stearate or zinc laurate is more preferable, and a particle of zinc stearate is still more preferable.

—Volume Average Particle Diameter of Fatty Acid Metal Salt Particle—

A volume average particle diameter of the fatty acid metal salt particle is preferably 0.1 μm or more and 10 μm or less, and more preferably 0.5 μm or more and 3 μm or less.

The volume average particle diameter of the fatty acid metal salt particle can be measured by, for example, the following method.

1 g of the toner as the measurement target is placed in a 1 L beaker, and 500 g of an aqueous solution having 5% surfactant (preferably sodium alkylbenzene sulfonate) is added thereto. After the external additive is detached from the toner particles by applying ultrasonic waves, centrifugal separation is performed. Since a density of the fatty acid metal salt particle is less than 1 and a density of the toner is usually 1 or more, the fatty acid metal salt particle is contained in the supernatant after the centrifugal separation. 2 ml of this supernatant is added to 100 ml to 150 ml of an electrolytic solution (ISOTON-II manufactured by Beckman Coulter, Inc.), and a dispersion treatment is performed for 1 minute by an ultrasonic disperser to obtain a measurement sample. Using a Coulter Multisizer II (manufactured by Beckman Coulter, Inc., aperture diameter: 100 μm), the particle diameter of 50,000 particles having a particle diameter of 2 μm or more and 60 μm or less is measured, a cumulative distribution by volume is drawn from the small diameter side, and the particle diameter corresponding to the cumulative percentage of 50% is defined as the volume average particle diameter (D50v).

—Particle Diameter Ratio (DT/DS) of Toner Particle to Fatty Acid Metal Salt Particle—

In the toner according to the present exemplary embodiment, when the volume average particle diameter of the toner particle is DT and the volume average particle diameter of the fatty acid metal salt particle is DS, a ratio (DT/DS) of the volume average particle diameter DT of the toner particle to the volume average particle diameter DS of the fatty acid metal salt particle is preferably 1.9 or more.

By setting the ratio (DT/DS) of the volume average particle diameter of the toner particle to the volume average particle diameter of the fatty acid metal salt particle within the above range, the fatty acid metal salt particle is easily physically adsorbed to the toner particle. Therefore, since a proportion of the toner having the fatty acid metal salt particle on the surface of the toner particle increases, the adhesion of the toner to the fixing member is further prevented.

The above ratio (DT/DS) is more preferably 2.3 or more and 5.0 or less, and still more preferably 2.6 or more and 4.7 or less.

The amount of the external additive externally added is, for example, preferably 0.01 mass % or more and 5 mass % or less, and more preferably 0.01 mass % or more and 2.0 mass % or less, based on the toner particle.

—Characteristics of Toner—

In the toner according to the present exemplary embodiment, a maximum endothermic peak temperature in first heating performed by a differential scanning calorimeter (DSC) is preferably 58° C. or higher and 75° C. or lower. When the maximum endothermic peak temperature of the toner is 58° C. or higher and 75° C. or lower, low-temperature fixability of the toner is improved.

The maximum endothermic peak temperature of the toner in the first heating by the differential scanning calorimeter (DSC) is measured as follows.

A differential scanning calorimeter DSC-7 manufactured by PerkinElmer Inc. is used, melting points of indium and zinc are used for temperature correction of a detection unit of the calorimeter, and heat of fusion of indium is used for correction of a calorific value. An aluminum pan is used as a sample, an empty pan is set for comparison, and a temperature is increased from a room temperature to 150° C. at a temperature rising rate of 10° C./min. Then, in an obtained endothermic curve, a temperature giving the maximum endothermic peak is obtained.

(Method for Producing Toner Particle)

The toner according to the present exemplary embodiment is obtained by preparing toner particle and then externally adding an external additive to the toner particle.

The toner particles may be produced by either a dry production method (such as a kneading pulverization method) or a wet production method (such as an aggregation and coalescence method, a suspension polymerization method, and a dissolution suspension method). These production methods are not particularly limited and known production methods are adopted. Among these, the toner particles are preferably obtained by the aggregation and coalescence method.

Specifically, in the case of producing the toner particles by the aggregation and coalescence method, the toner particles are produced by, for example, a step of preparing a resin particle dispersion liquid in which resin particles serving as a binder resin are dispersed (resin particle dispersion liquid preparation step), a step of aggregating resin particles (if necessary other particles) in the resin particle dispersion liquid (in a dispersion liquid after mixing other particle dispersion liquids if necessary), to form aggregated particles (aggregated particle forming step), and a step of heating an aggregated particle dispersion liquid in which the aggregated particles are dispersed to fuse and coalesce the aggregated particles to form toner particles (fusion and coalesce step).

Here, in order to set the Net intensity of each element in the toner particle within the above range, the supply source of the respective element may be added in the production process of the toner particle.

Hereinafter, details of each step will be described.

In the following description, a method for obtaining toner particles containing a colorant and a release agent will be described, but the colorant and the release agent are used as necessary. Of course, other additives other than the colorant and the release agent may be used.

—Resin Particle Dispersion Liquid Preparation Step—

First, a colorant particle dispersion liquid in which colorant particles are dispersed and a release agent particle dispersion liquid in which release agent particles are dispersed are prepared together with a resin particle dispersion liquid in which resin particles serving as a binder resin are dispersed.

Here, the resin particle dispersion liquid is prepared, for example, by dispersing resin particles in a dispersion medium with a surfactant.

Examples of the dispersion medium for use in the resin particle dispersion liquid include an aqueous medium.

Examples of the aqueous medium include water such as distilled water and ion-exchanged water, and alcohols. The aqueous medium may be used alone or in combination of two or more thereof.

Examples of the surfactant include: sulfate ester salt-based, sulfonate-based, phosphate ester-based, and soap-based anionic surfactants; amine salt-based and quaternary ammonium salt-based cationic surfactants; and polyethylene glycol-based, alkylphenol ethylene oxide adduct-based, and polyhydric alcohol-based nonionic surfactants. Among these, anionic surfactants and cationic surfactants are particularly preferred. The nonionic surfactant may be used in combination with an anionic surfactant or a cationic surfactant.

The surfactant may be used alone or in combination of two or more thereof.

For the resin particle dispersion liquid, examples of a method of dispersing the resin particles in the dispersion medium include general dispersion methods using a rotary shearing homogenizer, a ball mill having a media, a sand mill, and a dyno mill, or the like. Depending on a kind of the resin particles, the resin particles may be dispersed in the dispersion liquid by using a phase inversion emulsification method.

The phase inversion emulsification method is a method of dispersing a resin in an aqueous medium in a form of particles by dissolving a resin to be dispersed in a hydrophobic organic solvent in which the resin is soluble, adding a base to an organic continuous phase (O phase) for neutralization, and then adding an aqueous medium (W phase) to convert the resin from W/O to O/W (so-called phase inversion) to form a discontinuous phase.

A volume average particle diameter of the resin particles dispersing in the resin particle dispersion liquid is preferably, for example, 0.01 μm or more and 1 μm or less, more preferably 0.08 μm or more and 0.8 μm or less, and still more preferably 0.1 μm or more and 0.6 μm or less.

The volume average particle diameter D50v of the resin particles is calculated by the volume-based particle size distribution obtained by measurement of a laser diffraction-type particle diameter distribution measurement device (such as LA-700 manufactured by Horiba, Ltd.). A divided particle size range (so-called channels) is set, and the volume-based particle size distribution is obtained. Then, a cumulative distribution is drawn from a small particle diameter side and a particle diameter corresponding to the cumulative percentage of 50% with respect to all the particles is the volume average particle diameter D50v. A volume average particle diameter of the particles in other dispersion liquids is measured in the same manner.

A content of the resin particles contained in the resin particle dispersion liquid is preferably 5 mass % or more and 50 mass % or less, and more preferably 10 mass % or more and 40 mass % or less.

For example, the colorant particle dispersion liquid and the release agent particle dispersion liquid are prepared in the same manner as the resin particle dispersion liquid. That is, regarding the volume average particle diameter of particles, the dispersion medium, the dispersion method, and the content of the particles in the resin particle dispersion liquid, the same applies to the colorant particles dispersed in the colorant particle dispersion liquid and the release agent particles dispersed in the release agent particle dispersion liquid.

—First Aggregated Particle Forming Step—

Next, the resin particle dispersion liquid, the colorant particle dispersion liquid, and the release agent particle dispersion liquid are mixed.

Then, in the mixed dispersion liquid, the resin particles, the colorant particles, and the release agent particles are hetero-aggregated to form aggregated particles containing the resin particles, the colorant particles, and the release agent particles, which have a diameter close to a diameter of target toner particles.

Specifically, for example, an aggregating agent is added to the mixed dispersion liquid, a pH of the mixed dispersion liquid is adjusted to acidic (such as a pH of 2 or more and 5 or less), and a dispersion stabilizer is added if necessary. Then, the resin particles are heated to a temperature (specifically, for example, "the glass transition temperature of resin particles −30° C." or higher and "the glass transition temperature −10° C." or lower) of a glass transition temperature to aggregate the particles dispersed in the mixed dispersion liquid, and thus the aggregated particles are formed.

In the aggregated particle forming step, for example, the aggregating agent may be added at room temperature (for example, 25° C.) while stirring the mixed dispersion liquid with a rotary shearing homogenizer, the pH of the mixed dispersion may be adjusted to be acidic (for example, pH 2 or more and 5 or less), a dispersion stabilizer may be added as necessary, and then heating may be performed.

Examples of the aggregating agent include a surfactant having a polarity opposite to that of the surfactant used as a dispersant added in the mixed dispersion liquid, an inorganic metal salt, and a divalent or higher metal complex. In particular, when the metal complex is used as the aggregating agent, an amount of the surfactant used is reduced and chargeability is improved.

If necessary, an additive that forms a complex with the metal ion of the aggregating agent may be used. A chelating agent is preferably used as the additive.

Examples of the inorganic metal salt include: metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

A water-soluble chelating agent may be used as the chelating agent. Examples of the chelating agent include oxycarboxylic acids such as tartaric acid, citric acid and gluconic acid, iminodiacetic acid (IDA), nitrilotriacetic acid (NTA), and ethylenediaminetetraacetic acid (EDTA).

An addition amount of the chelating agent is preferably 0.01 part by mass or more and 5.0 parts by mass or less, and more preferably 0.1 part by mass or more and less than 3.0 parts by mass, based on 100 parts by mass of the resin particles.

—Second Aggregated Particle Forming Step—

The aggregated particle dispersion liquid is obtained, then the aggregated particle dispersion liquid is further mixed with the resin particle dispersion liquid in which the resin particles are dispersed, and the resin particles are aggregated so as to adhere to the surfaces of the aggregated particles, thereby forming second aggregated particles.

—Fusion and Coalesce Step—

Next, the second aggregated particle dispersion liquid in which the second aggregated particles are dispersed is heated to, for example, a temperature equal to or higher than the glass transition temperature of the resin particles (such as a temperature higher than the glass transition temperature of the resin particles by 10° C. to 30° C.) to fuse and coalesce the aggregated particles to form the toner particles.

After the above steps, the toner particles are obtained.

Here, after the fusion and coalesce step, the toner particles formed in the solution are subjected to a known washing step, a solid-liquid separation step, and a drying step to obtain dried toner particles.

In the washing step, from the viewpoint of chargeability, it is preferable to sufficiently perform displacement washing with ion-exchanged water. The solid-liquid separation step is not particularly limited, and absorption filtration, pressure filtration or the like may be performed from a viewpoint of productivity. The drying step is not particularly limited either, and freeze-drying, air-flow drying, fluidized drying, vibration-type fluidized drying or the like may be performed from the viewpoint of productivity.

Then, the toner particles according to the present exemplary embodiment are produced, for example, by adding an external additive to the obtained dried toner particles and performing mixing. The mixing may be performed by, for example, a V blender, a Henschel mixer, or a Loedige mixer. Further, if necessary, coarse particles in the toner may be removed by using a vibration sieving machine, a wind sieving machine or the like.

<Electrostatic Charge Image Developer>

The electrostatic charge image developer according to the present exemplary embodiment at least includes the toner according to the present exemplary embodiment.

The electrostatic charge image developer according to the present exemplary embodiment may be a one-component developer containing only the toner according to the present exemplary embodiment, or may be a two-component developer in which the toner and a carrier are mixed.

The carrier is not particularly limited, and examples thereof include known carriers. Examples of the carrier include a coated carrier in which a surface of a core made of a magnetic powder is coated with a coating resin; a magnetic powder dispersion-type carrier in which a magnetic powder is dispersed and blended in a matrix resin; and a resin impregnation-type carrier in which a porous magnetic powder is impregnated with a resin.

The magnetic powder dispersion-type carrier and the resin impregnation-type carrier may be carriers in which constituent particles of the carrier are core materials, and the core material is coated with a coating resin.

Examples of the magnetic powder include magnetic metals such as iron, nickel, and cobalt, and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured to include an organosiloxane bond or a modified product thereof, a fluororesin, polyester, polycarbonate, a phenol resin, and an epoxy resin.

The coating resin and the matrix resin may contain other additives such as conductive particles.

Examples of the conductive particles include particles of metals such as gold, silver, copper, and particles of carbon black, titanium oxide, zinc oxide, tin oxide, barium sulfate, aluminum borate, and potassium titanate.

Here, in order to coat surfaces of the core materials with the coating resin, a method of coating with a coating layer forming solution in which a coating resin and, if necessary, various additives are dissolved in an appropriate solvent is exemplified. The solvent is not particularly limited, and may be selected in consideration of the coating resin to be used, coating suitability, and the like.

Specific examples of the resin coating method include an immersion method in which the core material is immersed in the coating layer forming solution, a spray method in which the coating layer forming solution is sprayed onto the surfaces of the core materials, a fluidized bed method in which the coating layer forming solution is sprayed in a state in which the core material is suspended by fluidized air, and a kneader coater method in which the core material of the carrier and the coating layer forming solution are mixed in a kneader coater and the solvent is removed.

A mixing ratio (mass ratio) of the toner to the carrier in the two-component developer is preferably toner:carrier=1:100 to 30:100, and more preferably 3:100 to 20:100.

<Image Forming Apparatus and Image Forming Method>

An image forming apparatus and an image forming method according to the present exemplary embodiment will be described.

The image forming apparatus according to the present exemplary embodiment includes: an image carrier; a charging unit that charges a surface of the image carrier; an electrostatic charge image forming unit that forms an electrostatic charge image on the surface of the charged image carrier; a developing unit that stores an electrostatic charge image developer and develops, as a toner image, the electrostatic charge image formed on the surface of the image carrier by using the electrostatic charge image developer; a transfer unit that transfers the toner image formed on the surface of the image carrier onto a surface of a recording medium; and a fixing unit that fixes the toner image transferred on the surface of the recording medium. Then, the electrostatic charge image developer according to the present exemplary embodiment is applied as the electrostatic charge image developer.

In the image forming apparatus according to the present exemplary embodiment, an image forming method (an image forming method according to the present exemplary embodiment) is performed, which includes: a charging step of charging the surface of the image carrier; an electrostatic charge image forming step of forming the electrostatic charge image on the surface of the charged image carrier; a developing step of developing, by the electrostatic charge image developer, the electrostatic charge image formed on the surface of the image carrier as the toner image; a transfer step of transferring the toner image formed on the surface of the image carrier to the surface of the recording medium; and a fixing step of fixing the toner image transferred to the surface of the recording medium.

As the image forming apparatus according to the present exemplary embodiment, known image forming apparatuses are applied, for example, a direct transfer type apparatus that directly transfers the toner image formed on the surface of the image carrier onto the recording medium, an intermediate transfer type apparatus that primarily transfers the toner image formed on the surface of the image carrier onto a surface of an intermediate transfer body, and secondarily transfers the toner image transferred on the surface of the intermediate transfer body onto the surface of the recording medium, an apparatus including a cleaning unit that cleans the surface of the image carrier before the charging after the transfer of the toner image, and an apparatus including a discharging unit that performs discharging by irradiating the surface of the image carrier before the charging after the transfer of the toner image with discharging light.

When an intermediate transfer type apparatus is applied, the transfer unit includes, for example, an intermediate transfer body with a toner image transferred onto the surface thereof, a primary transfer unit that primarily transfers the toner image formed on the surface of the image carrier onto the surface of the intermediate transfer body, and a secondary transfer unit that secondarily transfers the toner image transferred on the surface of the intermediate transfer body onto the surface of the recording medium.

In the image forming apparatus according to the present exemplary embodiment, for example, a portion including the developing unit may have a cartridge structure (process cartridge) that is attached to and detached from the image forming apparatus. As the process cartridge, for example, a process cartridge including a developing unit that stores the electrostatic charge image developer according to the present exemplary embodiment is preferably used.

Hereinafter, an example of the image forming apparatus according to the present exemplary embodiment will be described, but the image forming apparatus is not limited thereto. Main parts illustrated in the drawings will be described, and description of the other parts will be omitted.

FIG. 1 is a schematic configuration diagram illustrating the image forming apparatus according to the present exemplary embodiment.

The image forming apparatus illustrated in FIG. 1 includes first to fourth electrophotographic image forming units 10Y, 10M, 10C, and 10K (image forming unit) that output images of respective colors of yellow (Y), magenta (M), cyan (C), and black (K) based on image data subjected to color separation. These image forming units (hereinafter, may also be simply referred to as "units") 10Y, 10M, 10C, and 10K are arranged side by side in a horizontal direction with a predetermined distance therebetween. These units 10Y, 10M, 10C, and 10K may be process cartridges that are attached to and detached from the image forming apparatus.

In FIG. 1, 1Y, 1M, 1C, and 1K denote photoconductors (examples of image carriers), 2Y, 2M, 2C, and 2K denote charging rollers (examples of charging units), 3Y, 3M, 3C, and 3K denote laser beams, and 6Y, 6M, 6C, and 6K denote photoconductor cleaning devices (examples of cleaning units).

Above the units 10Y, 10M, 10C, and 10K in the drawing, an intermediate transfer belt 20 as the intermediate transfer body is extended through the units. The intermediate transfer belt 20 is provided around a drive roller 22 and a support roller 24 in contact with an inner surface of the intermediate transfer belt 20, which are disposed to be separated from each other from the left to the right in the drawing, and travels in a direction from the first unit 10Y to the fourth unit 10K. A spring or the like (not illustrated) of the support roller 24 applies a force in a direction away from the drive roller 22, and tension is applied to the intermediate transfer belt 20 wound around the support roller 24 and the drive roller 22. An intermediate transfer body cleaning device 30 is provided on an image carrier side surface of the intermediate transfer belt 20 so as to face the drive roller 22.

Developing devices 4Y, 4M, 4C, and 4K (developing unit) of the units 10Y, 10M, 10C, and 10K are supplied with a toner including yellow, magenta, cyan, and black toners stored in toner cartridges 8Y, 8M, 8C, and 8K, respectively.

Since the first to fourth units 10Y, 10M, 10C, and 10K have the same configuration, here, the first unit 10Y, which is arranged on an upstream side in the traveling direction of the intermediate transfer belt and forms a yellow image, will be described as a representative. Portions equivalent to those of the first unit 10Y are denoted by adding reference numerals with magenta (M), cyan (C), and black (K) instead of yellow (Y), and descriptions of the second to fourth units 10M, 10C, and 10K are omitted.

The first unit 10Y includes a photoconductor 1Y functioning as an image carrier. Around the photoconductor 1Y, the following members are disposed in order: the charging roller 2Y (an example of the charging unit) for charging a surface of the photoconductor 1Y to a predetermined potential; an exposure device 3 (an example of the electrostatic charge image forming unit) for forming an electrostatic charge image by exposing the charged surface with the laser beam 3Y based on an image signal subjected to color separation; a developing device 4Y (an example of the developing unit) for developing the electrostatic charge image by supplying a charged toner to the electrostatic charge image; a primary transfer roller 5Y (an example of the primary transfer unit) for transferring the developed toner image onto the intermediate transfer belt 20; and the photoconductor cleaning device 6Y (an example of the cleaning unit) for removing the toner remaining on the surface of the photoconductor 1Y after the primary transfer.

The primary transfer roller 5Y is disposed inside the intermediate transfer belt 20 and is provided at a position facing the photoconductor 1Y. A bias power source (not illustrated) for applying a primary transfer bias is connected to each of the primary transfer rollers 5Y, 5M, 5C, and 5K. Each bias power source can change a transfer bias applied to each primary transfer roller under the control of a controlling unit (not illustrated).

Hereinafter, an operation of forming a yellow image in the first unit 10Y will be described.

First, prior to the operation, the surface of the photoconductor 1Y is charged to a potential of −600 V to −800 V by using the charging roller 2Y.

The photoconductor 1Y is formed by laminating a photoconductive layer on a conductive substrate (such as having volume resistivity at 20° C. of $1\times10^{-6}$ Ωcm or less). The photoconductive layer generally has high resistance (resistance of general resin), but, has a property that when irradiated with the laser beam 3Y, specific resistance of the portion irradiated with the laser beam changes. Therefore, the laser beam 3Y is output to the charged surface of the photoconductor 1Y via the exposure device 3 according to yellow image data sent from the controller (not illustrated). The photosensitive layer on the surface of the photoconductor 1Y is irradiated with the laser beam 3Y, and accordingly, an electrostatic charge image having a yellow image pattern is formed on the surface of the photoconductor 1Y.

The electrostatic charge image is an image formed on the surface of the photoconductor 1Y by charging, and is a so-called negative latent image formed by lowering the specific resistance of the portion of the photoconductive layer irradiated with the laser beam 3Y to flow charges charged on the surface of the photoconductor 1Y and by, on the other hand, leaving charges of a portion not irradiated with the laser beam 3Y.

The electrostatic charge image formed on the photoconductor 1Y rotates to a predetermined developing position as the photoconductor 1Y travels. Then, at this developing position, the electrostatic charge image on the photoconductor 1Y is visualized (developed) as a toner image by the developing device 4Y.

In the developing device 4Y, for example, an electrostatic charge image developer containing at least a yellow toner and a carrier is stored. The yellow toner is frictionally charged by being stirred in the developing device 4Y, and has a charge of the same polarity (negative) as the charge charged on the photoconductor 1Y and is carried on a developer roller (an example of a developer carrier). Then, when the surface of the photoconductor 1Y passes through the developing device 4Y, the yellow toner electrostatically adheres to a discharged latent image portion on the surface of the photoconductor 1Y, and the latent image is developed by the yellow toner. The photoreceptor 1Y on which the yellow toner image is formed continuously travels at a predetermined speed, and the toner image developed on the photoconductor 1Y is conveyed to a predetermined primary transfer position.

When the yellow toner image on the photoconductor 1Y is conveyed to the primary transfer position, a primary transfer bias is applied to the primary transfer roller 5Y, an electrostatic force from the photoconductor 1Y to the primary transfer roller 5Y acts on the toner image, and the toner image on the photoconductor 1Y is transferred onto the intermediate transfer belt 20. The transfer bias applied at this time has a polarity (+) opposite to the polarity (−) of the toner, and is controlled to +10 μA by the controller (not illustrated), for example, in the first unit 10Y.

On the other hand, the toner remaining on the photoconductor 1Y is removed and collected by the photoconductor cleaning device 6Y.

The primary transfer bias applied to the primary transfer rollers 5M, 5C, and 5K at and after the second unit 10M is also controlled in the same manner as in the first unit.

In this way, the intermediate transfer belt 20 onto which the yellow toner image is transferred by the first unit 10Y is sequentially conveyed through the second to fourth units 10M, 10C, and 10K, and the toner images of the respective colors are superimposed and transferred in a multiple manner.

The intermediate transfer belt 20 onto which the toner images of four colors are transferred in a multiple manner through the first to fourth units arrives at a secondary transfer unit including the intermediate transfer belt 20, the support roller 24 in contact with the inner surface of the intermediate transfer belt, and a secondary transfer roller 26 (an example of the secondary transfer unit) disposed on the image carrying surface side of the intermediate transfer belt 20. On the other hand, recording paper P (an example of the recording medium) is fed through a supply mechanism into a gap where the secondary transfer roller 26 and the intermediate transfer belt 20 are in contact with each other at a predetermined timing, and a secondary transfer bias is applied to the support roller 24. The transfer bias applied at this time has the same polarity (−) as the toner polarity (−). The electrostatic force from the intermediate transfer belt 20 to the recording paper P acts on the toner image, and the toner image on the intermediate transfer belt 20 is transferred onto the recording paper P. The secondary transfer bias at this time is determined according to the resistance detected by a resistance detection unit (not illustrated) for detecting the resistance of the secondary transfer unit, and is voltage-controlled.

Thereafter, the recording paper P is sent to a pressure contact portion (so-called nip portion) of a pair of fixing rollers in a fixing device 28 (an example of the fixing unit), the toner image is fixed to the recording paper P, and a fixed image is formed.

Examples of the recording paper P onto which the toner image is transferred include plain paper used in electrophotographic copiers and printers. As the recording medium, in addition to the recording paper P, an OHP sheet or the like may be used.

In order to further improve the smoothness of the image surface after fixing, the surface of the recording sheet P is also preferably smooth. For example, coated paper obtained by coating the surface of plain paper with a resin or the like, art paper for printing, or the like is preferably used.

The recording sheet P on which the fixing of the color image is completed is conveyed out toward a discharge unit, and a series of color image forming operations is completed.

<Process Cartridge and Toner Cartridge>

The process cartridge according to the present exemplary embodiment will be described.

The process cartridge according to the exemplary embodiment is a process cartridge which includes a developing unit that stores the electrostatic charge image developer according to the present exemplary embodiment and develops, as a toner image, the electrostatic charge image formed on the surface of the image carrier by using the electrostatic charge image developer, and which is attached to and detached from the image forming apparatus.

The process cartridge according to the present exemplary embodiment is not limited to the above configuration, and may be configured to include a developing unit and, if necessary, at least one selected from other units such as an image carrier, a charging unit, an electrostatic charge image forming unit, and a transfer unit.

Hereinafter, an example of the process cartridge according to the present exemplary embodiment will be illustrated, but the process cartridge is not limited thereto. Main parts illustrated in the drawings will be described, and description of the other parts will be omitted.

Figure 2:
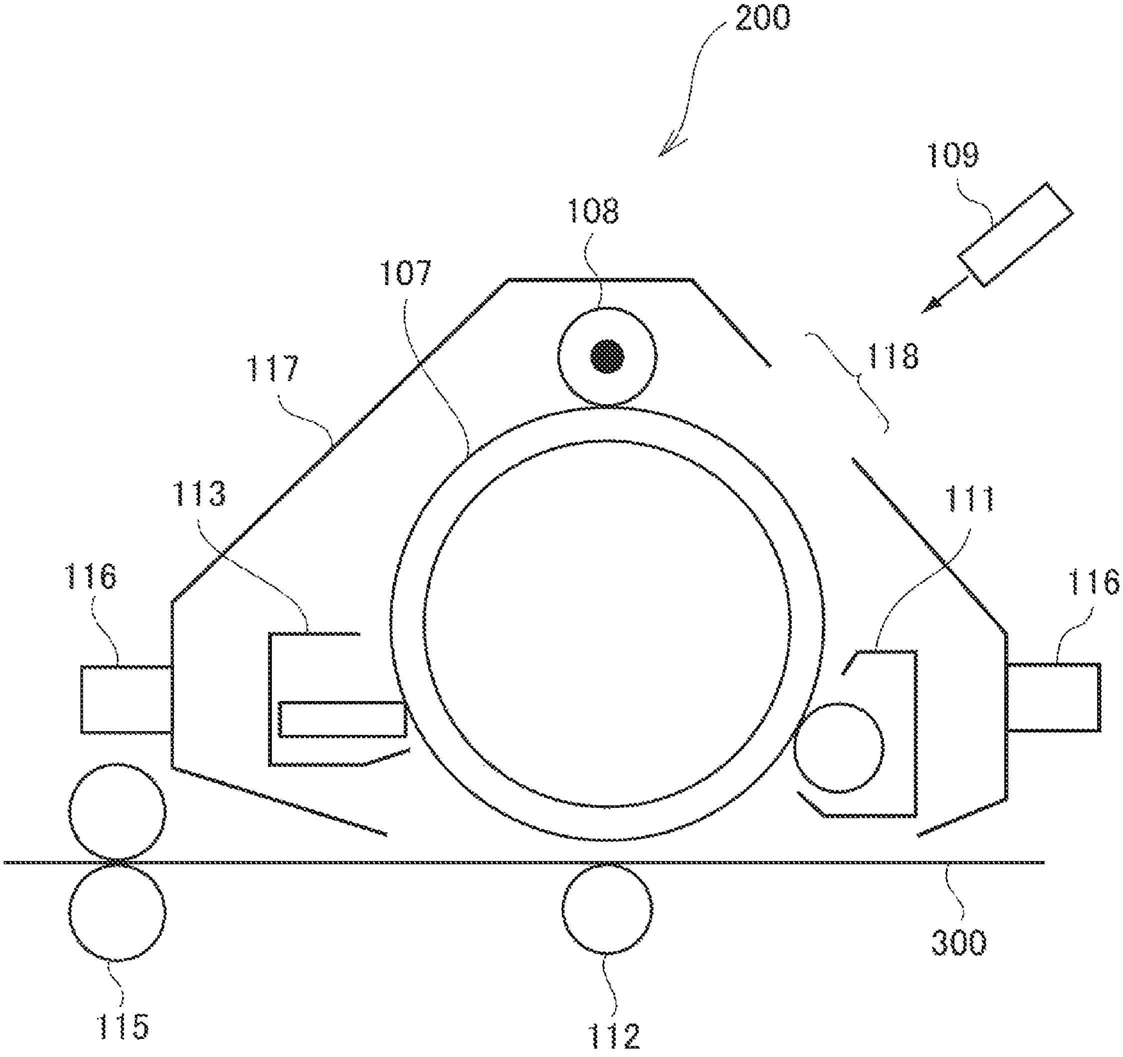
FIG. 2 is a schematic configuration diagram illustrating an example of a process cartridge according to the present exemplary embodiment.

FIG. 2 is a schematic configuration diagram illustrating the process cartridge according to the present exemplary embodiment.

A process cartridge 200 illustrated in FIG. 2 is configured as a cartridge by, for example, integrally combining and holding a photoconductor 107 (an example of the image carrier), a charging roller 108 (an example of the charging unit) provided around the photoconductor 107, a developing device 111 (an example of the developing unit), and a photoconductor cleaning device 113 (an example of the cleaning unit) by a housing 117 provided with a mounting rail 116 and an opening 118 for exposure.

In FIG. 2, 109 denotes an exposure device (an example of the electrostatic charge image forming unit), 112 denotes a transfer device (an example of the transfer unit), 115 denotes a fixing device (an example of the fixing unit), and 300 denotes recording paper (an example of the recording medium).

Next, the toner cartridge according to the present exemplary embodiment will be described.

The toner cartridge according to the present exemplary embodiment is a toner cartridge that stores the toner according to the present exemplary embodiment and is attached to and detached from the image forming apparatus. The toner cartridge stores a toner for replenishment to be supplied to the developing unit provided in the image forming apparatus.

The image forming apparatus illustrated in FIG. 1 is an image forming apparatus having a configuration in which the toner cartridges 8Y, 8M, 8C, and 8K are attached and detached, and the developing devices 4Y, 4M, 4C, and 4K are connected to toner cartridges corresponding to the respective developing devices (colors) by toner supply pipes (not illustrated). When the amount of the toner stored in the toner cartridge decreases, the toner cartridge is replaced.

Figure 3:
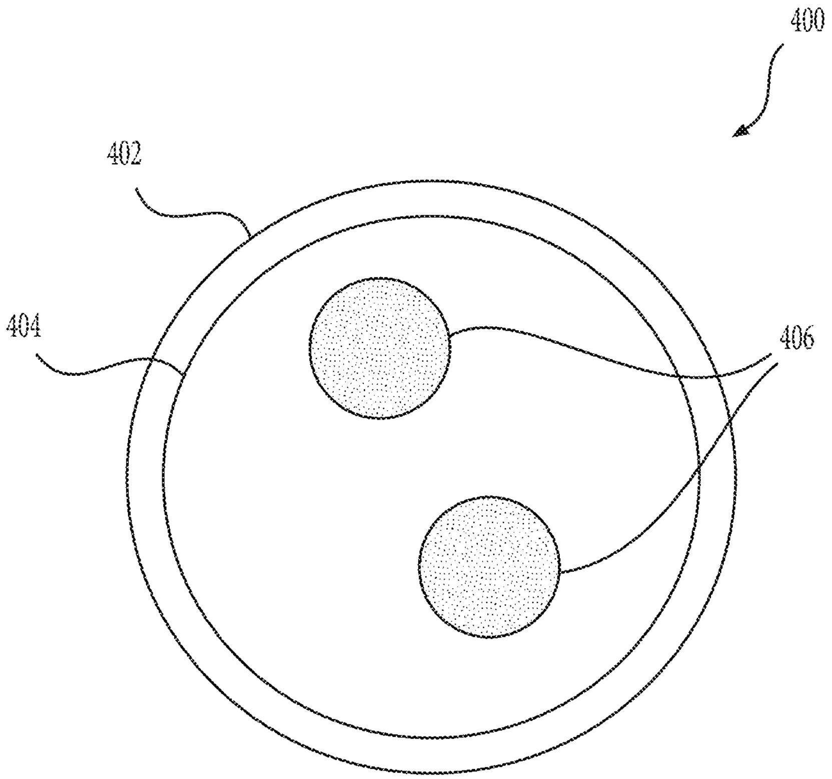
FIG. 3 is a schematic diagram illustrating a cross section of a toner particle with a core portion and a coating layer and domains of the release agent in the core portion, according to the present exemplary embodiment.

FIG. 3 is a schematic depiction of a toner particle 400 with a coating layer 402, a core portion 404, and domains 406 of the release agent in the core portion 404.

EXAMPLES

Hereinafter, although Examples will be described, the present invention is not limited to Examples at all. In the following description, all "parts" and "%" are based on mass unless otherwise specified.

Hereinafter, the exemplary embodiment according to the invention will be described in detail with reference to Examples, but the exemplary embodiment according to the invention is not limited to these Examples. In the following description, the "parts" and "%" are based on mass unless otherwise specified.

(Synthesis of Amorphous Polyester Resin (A))

Terephthalic acid: 68 parts
Fumaric acid: 32 parts
Ethylene glycol: 42 parts
1,5-pentanediol: 47 parts The above materials are put into a flask equipped with a stirrer, a nitrogen inlet tube, a temperature sensor, and a rectifying column, the temperature is raised to 220° C. over 1 hour under a nitrogen gas stream, and 1 part of titanium tetraethoxide is added to 100 parts of the total of the above materials. The temperature is raised to 240° C. over 0.5 hours while distilling off produced water, and after continuing a dehydration condensation reaction at 240° C. for 1 hour, a reaction product is cooled. In this way, an amorphous polyester resin (A) having a weight average molecular weight of 97000 and a glass transition temperature of 60° C. is obtained.

(Preparation of Amorphous Polyester Resin Particle Dispersion Liquid (A1))

40 parts of ethyl acetate and 25 parts of 2-butanol are put into a vessel equipped with a temperature control unit and a nitrogen substitution unit to prepare a mixed solvent, then 100 parts of the amorphous polyester resin (A) is gradually added and dissolved, and a 10% ammonia aqueous solution (corresponding to 3 times the acid value of the resin in terms of molar ratio) is added thereto, followed by stirring for 30 minutes. Next, an inside of the vessel is replaced with dry nitrogen, the temperature is maintained at 40° C., and 400 parts of ion-exchanged water is added dropwise while stirring a mixed solution to perform emulsification. After completion of the dropwise addition, a temperature of an emulsion is returned to 25° C. to obtain a resin particle dispersion liquid in which resin particles having a volume average particle diameter of 195 nm are dispersed. Ion-exchanged water is added to the resin particle dispersion liquid to adjust a solid content to 20%, thereby obtaining an amorphous polyester resin particle dispersion liquid (A1).

(Preparation of Crystalline Polyester Resin Particle Dispersion Liquid (B1))

1,10-decanedicarboxylic acid: 260 parts
1,6-hexanediol: 167 parts
Dibutyltin oxide (catalyst): 0.3 parts The above materials are put into a heated and dried three-neck flask, air in the three-neck flask is replaced with nitrogen gas to make an inert atmosphere, and stirring and refluxing are performed at 180° C. for 5 hours by mechanical stirring. Subsequently, the temperature is gradually increased to 230° C. under a reduced pressure, the mixture is stirred for 2 hours, and when the mixture is in a viscous state, air cooling is performed to stop the reaction. In this way, an crystalline polyester resin having a weight average molecular weight of 12500 and a melting temperature of 73° C. is obtained. 90 parts of the crystalline polyester resin, 1.8 parts of an anionic surfactant (Tayca Power, manufactured by Tayca Corporation, solid content: 12%, sodium dodecylbenzenesulfonate), and 210 parts of ion-exchanged water are mixed, heated to 120° C., dispersed by using a homogenizer (Ultra Turrax T50, manufactured by IKA-Werke), and then subjected to a dispersion treatment for 1 hour by using a pressure-discharge-type Gaulin homogenizer to obtain a resin particle dispersion liquid in which resin particles having a volume average particle diameter of 195 nm are dispersed. Ion-exchanged water is added to the resin particle dispersion liquid to adjust a solid content to 20%, thereby obtaining a crystalline polyester resin particle dispersion liquid (B1).

(Preparation of Styrene Acrylic Resin Particle Dispersion Liquid (S1))

Styrene: 375 parts
n-butyl acrylate: 25 parts
Acrylic acid: 2 parts
Dodecanthiol: 24 parts
Carbon tetrabromide: 4 parts A mixture obtained by mixing and dissolving the above materials is dispersed and emulsified in a flask in a surfactant solution obtained by dissolving 6 parts of a nonionic surfactant (Nonipole 400, manufactured by Sanyo Chemical Industries, Ltd.) and 10 parts of an anionic surfactant (Tayca Power, manufactured by Tayca Corporation, solid content: 12%, sodium dodecylbenzenesulfonate) in 550 parts of ion-exchanged water. Next, an aqueous solution in which 4 parts of ammonium persulfate is dissolved in 50 parts of ion-exchanged water is added into the flask over 20 minutes while stirring the inside of the flask. Subsequently, after performing nitrogen substitution, the flask is heated in an oil bath until the temperature of the content reaches 70° C. while stirring the inside of the flask, and the temperature is maintained at 70° C. for 5 hours to continue emulsion polymerization. In this way, a resin particle dispersion liquid in which resin particles having a volume average particle diameter of 150 nm are dispersed is obtained. Ion-exchanged water is added to the resin particle dispersion liquid to adjust a solid content to 20%, thereby obtaining the styrene acrylic resin particle dispersion liquid (S1).

[Preparation of Colorant Particle Dispersion Liquid (Ku1)]

Carbon black (Regal 330 manufactured by Cabot Corporation): 50 parts

Anionic surfactant (Tayca Power, manufactured by Tayca Corporation): 5 parts

Ion-exchanged water: 193 parts

The above materials are mixed and dispersed at 240 MPa for 10 minutes by using ULTIMAIZER (manufactured by Sugino Machine Limited), and ion-exchanged water is added to obtain a colorant particle dispersion liquid (Ku1) having a solid content of 20%.

(Preparation of Release Agent Particle Dispersion Liquid (W1))

Ester wax (WEP-8, melting temperature: 79° C., manufactured by NOF Corporation): 100 parts Anionic surfactant: 1 part (Tayca Power, manufactured by Tayca Corporation, sodium dodecylbenzenesulfonate)

Ion-exchanged water: 350 parts

The above materials are mixed, heated to 100° C., and dispersed using a homogenizer (Ultra Turrax T50, manufactured by IKA-Werke), and then a dispersion treatment is performed using a pressure discharge Gaulin homogenizer, to obtain a release agent particle dispersion liquid in which release agent particles having a volume average particle diameter of 1000 nm are dispersed. Ion-exchanged water is added to the release agent particle dispersion liquid to adjust the solid content to 20% to obtain a release agent particle dispersion liquid (W1).

(Preparation of Release Agent Particle Dispersion Liquid (W2))

Ester wax (WEP-5, melting temperature: 82° C., manufactured by NOF Corporation): 100 parts Anionic surfactant: 1 part (Tayca Power, manufactured by Tayca Corporation, sodium dodecylbenzenesulfonate)

Ion-exchanged water: 350 parts

The above materials are mixed, heated to 100° C., and dispersed using a homogenizer (Ultra Turrax T50, manufactured by IKA-Werke), and then a dispersion treatment is performed using a pressure discharge Gaulin homogenizer, to obtain a release agent particle dispersion liquid in which release agent particles having a volume average particle diameter of 220 nm are dispersed. Ion-exchanged water is added to the release agent particle dispersion liquid to adjust the solid content to 20% to obtain a release agent particle dispersion liquid (W2).

(Preparation of Release Agent Particle Dispersion Liquid (W3))

Ester wax (WEP-8, melting temperature: 79° C., manufactured by NOF Corporation): 100 parts Anionic surfactant: 1 part (Tayca Power, manufactured by Tayca Corporation, sodium dodecylbenzenesulfonate)

Ion-exchanged water: 350 parts

The above materials are mixed, heated to 100° C., and dispersed using a homogenizer (Ultra Turrax T50, manufactured by IKA-Werke), and then a dispersion treatment is performed using a pressure discharge Gaulin homogenizer, to obtain a release agent particle dispersion liquid in which release agent particles having a volume average particle diameter of 2000 nm are dispersed. Ion-exchanged water is added to the release agent particle dispersion liquid to adjust the solid content to 20% to obtain a release agent particle dispersion liquid (W3).

(Preparation of Release Agent Particle Dispersion Liquid (W4))

Ester wax (WEP-8, melting temperature: 79° C., manufactured by NOF Corporation): 100 parts Anionic surfactant: 1 part (Tayca Power, manufactured by Tayca Corporation, sodium dodecylbenzenesulfonate)

Ion-exchanged water: 350 parts

The above materials are mixed, heated to 100° C., and dispersed using a homogenizer (Ultra Turrax T50, manufactured by IKA-Werke), and then a dispersion treatment is performed using a pressure discharge Gaulin homogenizer, to obtain a release agent particle dispersion liquid in which release agent particles having a volume average particle diameter of 500 nm are dispersed. Ion-exchanged water is added to the release agent particle dispersion liquid to adjust the solid content to 20% to obtain a release agent particle dispersion liquid (W4).

(Preparation of Release Agent Particle Dispersion Liquid (W5))

Ester wax (WEP-5, melting temperature: 82° C., manufactured by NOF Corporation): 100 parts Anionic surfactant: 1 part (Tayca Power, manufactured by Tayca Corporation, sodium dodecylbenzenesulfonate)

Ion-exchanged water: 350 parts

The above materials are mixed, heated to 100° C., and dispersed using a homogenizer (Ultra Turrax T50, manufactured by IKA-Werke), and then a dispersion treatment is performed using a pressure discharge Gaulin homogenizer, to obtain a release agent particle dispersion liquid in which release agent particles having a volume average particle diameter of 100 nm are dispersed. Ion-exchanged water is added to the release agent particle dispersion liquid to adjust the solid content to 20% to obtain a release agent particle dispersion liquid (W5).

Example 1

[Preparation of Toner Particle]

[Preparation of Toner Particle (K1)]

—First Aggregated Particle Forming Step—

Ion-exchange water: 200 parts

Colorant particle dispersion liquid (Ku1): 15 parts

Release agent particle dispersion liquid (W1): 10 parts

Styrene acrylic resin particle dispersion liquid (S1): 144 parts

Crystalline Polyester Resin Particle Dispersion Liquid (B1): 26 parts

Amorphous Polyester Resin (A): 5 parts

The above materials are put into a round stainless steel flask, and 0.1N (0.1 mol/L) nitric acid is added thereto to adjust the pH to 3.5, and then a magnesium chloride aqueous solution in which 6 parts of magnesium chloride is dissolved in 30 parts of ion-exchanged water is added. The mixture is dispersed at 30° C. by using the homogenizer (Ultra Turrax T50, manufactured by IKA-Werke), then heated to 45° C. in an oil bath for heating, and held until the volume average particle diameter becomes 4.5 μm.

—Second Aggregated Particle Forming Step—

Next, 30 parts of the amorphous polyester resin particle dispersion liquid (A1) and 15 parts of the crystalline polyester resin particle dispersion liquid (B1) are added and held for 30 minutes. These two dispersion liquids are added every 30 minutes for a total of 4 times.

Next, 40 parts of the amorphous polyester resin particle dispersion liquid (A1) is added, and the pH is adjusted to 9.0 by using a 1N sodium hydroxide aqueous solution.

—Fusion and Coalesce Step—

Next, while continuing stirring, the temperature is increased to 85° C. at a temperature rising rate of 0.05° C./min, held at 85° C. for 3 hours, and then cooled to 30° C. at a temperature increase rate of 15° C./min (first cooling). Next, the mixture is heated to 85° C. at a temperature rising rate of 0.2° C./min (reheated), held for 30 minutes, and then cooled to 30° C. at a temperature rising rate of 0.5° C./min (second cooling).

Next, the solid content is separated by filtration, cleaned with ion-exchanged water, and dried to obtain black toner particle (K1) having a volume average particle diameter of 4.7 μm.

[External Addition of External Additive]

100 parts of the black toner particle (K1) and 1.5 parts of hydrophobic silica (RY50 manufactured by Nippon Aerosil Co., Ltd.) are mixed with each other by using a sample mill at a rotation speed of 10,000 rpm for 30 seconds. The mixture is sieved with a vibrating sieve having an opening of 45 μm to obtain a black toner (KT1).

[Preparation of Carrier]

After 500 parts of spherical magnetite powder particles (having a volume average particle diameter of 0.55 μm) are stirred in a Henschel mixer, 5 parts of a titanate coupling agent is added thereto, the temperature is raised to 100° C., and the mixture is stirred for 30 minutes. Next, 6.25 parts of phenol, 9.25 parts of 35% formalin, 500 parts of magnetite particles treated with a titanate coupling agent, 6.25 parts of 25% ammonia water, and 425 parts of water are put into a four-neck flask and stirred to react at 85° C. for 120 minutes while stirring. Subsequently, the mixture is cooled to 25° C., 500 parts of water is added thereto, a supernatant liquid is removed, and precipitate is washed with water. The washed precipitate is dried by heating under a reduced pressure to obtain a carrier (CA) having an average particle diameter of 35 μm.

[Mixing of Toner and Carrier]

The black toner (KT1) and the carrier (CA) are put into a V blender at a ratio of black toner (KT1):carrier (CA)=5:95 (mass ratio) and stirred for 20 minutes to obtain a black developer (KD1).

Example 2

A black toner (KT2) and a black developer (KD2) are obtained in the same manner as in Example 1 except that the release agent particle dispersion liquid (W1) is changed to the release agent particle dispersion liquid (W3).

Example 3

A black toner (KT3) and a black developer (KD3) are obtained in the same manner as in Example 1 except that the release agent particle dispersion liquid (W1) is changed to the release agent particle dispersion liquid (W4).

Example 4

A black toner (KT4) and a black developer (KD4) are obtained in the same manner as in Example 1 except that in the second aggregated particle forming step, the addition amounts of the amorphous polyester resin particle dispersion liquid (A1) and the crystalline polyester resin particle dispersion liquid (B1) added four times in total are changed to 3 parts and 1.5 parts, respectively.

Example 5

A black toner (KT5) and a black developer (KD5) are obtained in the same manner as in Example 1 except that in the second aggregated particle forming step, the addition amounts of the amorphous polyester resin particle dispersion liquid (A1) and the crystalline polyester resin particle dispersion liquid (B1) added four times in total are changed to 75 parts and 37.5 parts, respectively.

Example 6

A black toner (KT6) and a black developer (KD6) are obtained in the same manner as in Example 1 except that in the preparation of the toner particle, the styrene acrylic resin particle dispersion liquid (S1) is not added.

Example 7

A black toner (KT7) and a black developer (KD7) are obtained in the same manner as in Example 1 except that the addition amounts of the styrene acrylic resin particle dispersion liquid (S1), the crystalline polyester resin particle dispersion liquid (B1), and the amorphous polyester resin (A) added in the first aggregated particle forming step are changed to 85.8 parts, 26.2 parts, and 63 parts, respectively.

Example 8

A black toner (KT8) and a black developer (KD8) are obtained in the same manner as in Example 1 except that the addition amount of Ku1 is changed to 7.5 parts.

Example 9

A black toner (KT9) and a black developer (KD9) are obtained in the same manner as in Example 1 except that the addition amount of Ku1 is changed to 9.4 parts.

Example 10

A black toner (KT10) and a black developer (KD10) are obtained in the same manner as in Example 1 except that the addition amount of Ku1 is changed to 22.5 parts.

Example 11

A black toner (KT11) and a black developer (KD11) are obtained in the same manner as in Example 1 except that the addition amount of Ku1 is changed to 24.4 parts.

Example 12

A black toner (KT12) and a black developer (KD12) are obtained in the same manner as in Example 1 except that the magnesium chloride aqueous solution is changed to a mixed solution in which 1.3 parts of sodium chloride, 0.6 parts of magnesium chloride, and 0.7 parts of calcium chloride are dissolved in 30 parts of ion-exchanged water.

Example 13

A black toner (KT13) and a black developer (KD13) are obtained in the same manner as in Example 1 except that the magnesium chloride aqueous solution is changed to a mixed solution in which 1.3 parts of sodium chloride, 0.6 parts of magnesium chloride, 0.7 parts of calcium chloride, and 3.3 parts of potassium chloride are dissolved in 30 parts of ion-exchanged water.

Example 14

A black toner (KT14) and a black developer (KD14) are obtained in the same manner as in Example 1 except that the magnesium chloride aqueous solution is changed to a mixed solution in which 1.3 parts of sodium chloride, 0.6 parts of magnesium chloride, 0.7 parts of calcium chloride, and 28.2 parts of potassium chloride are dissolved in 30 parts of ion-exchanged water.

Example 15

A black toner (KT15) and a black developer (KD15) are obtained in the same manner as in Example 1 except that the magnesium chloride aqueous solution is changed to a mixed solution in which 1.3 parts of sodium chloride, 0.6 parts of magnesium chloride, 0.7 parts of calcium chloride, and 36.5 parts of potassium chloride are dissolved in 30 parts of ion-exchanged water.

Example 16

A black toner (KT16) and a black developer (KD16) are obtained in the same manner as in Example 1 except that the magnesium chloride aqueous solution is changed to a mixed solution in which 4.3 parts of sodium chloride is dissolved in 30 parts of ion-exchanged water.

Example 17

A black toner (KT17) and a black developer (KD17) are obtained in the same manner as in Example 1 except that the magnesium chloride aqueous solution is changed to a mixed solution in which 6.3 parts of sodium chloride is dissolved in 30 parts of ion-exchanged water.

Example 18

A black toner (KT18) and a black developer (KD18) are obtained in the same manner as in Example 1 except that the magnesium chloride aqueous solution is changed to a mixed solution in which 18.9 parts of sodium chloride is dissolved in 30 parts of ion-exchanged water.

Example 19

A black toner (KT19) and a black developer (KD19) are obtained in the same manner as in Example 1 except that the magnesium chloride aqueous solution is changed to a mixed solution in which 19.3 parts of sodium chloride is dissolved in 30 parts of ion-exchanged water.

Example 20

A black toner (KT20) and a black developer (KD20) are obtained in the same manner as in Example 1 except that the amount of magnesium chloride added when preparing the magnesium chloride aqueous solution is changed to 22.2 parts.

Example 21

A black toner (KT21) and a black developer (KD21) are obtained in the same manner as in Example 1 except that the amount of magnesium chloride added when preparing the magnesium chloride aqueous solution is changed to 3.2 parts.

Example 22

A black toner (KT22) and a black developer (KD22) are obtained in the same manner as in Example 1 except that the amount of magnesium chloride added when preparing the magnesium chloride aqueous solution is changed to 9.6 parts.

Example 23

A black toner (KT23) and a black developer (KD23) are obtained in the same manner as in Example 1 except that the amount of magnesium chloride added when preparing the magnesium chloride aqueous solution is changed to 9.8 parts.

Example 24

A black toner (KT24) and a black developer (KD24) are obtained in the same manner as in Example 1 except that the magnesium chloride aqueous solution is changed to a calcium chloride aqueous solution in which 2.6 parts of calcium chloride is dissolved in 30 parts of ion-exchanged water.

Example 25

A black toner (KT25) and a black developer (KD25) are obtained in the same manner as in Example 1 except that the magnesium chloride aqueous solution is changed to a calcium chloride aqueous solution in which 3.7 parts of calcium chloride is dissolved in 30 parts of ion-exchanged water.

Example 26

A black toner (KT26) and a black developer (KD26) are obtained in the same manner as in Example 1 except that the magnesium chloride aqueous solution is changed to a calcium chloride aqueous solution in which 11.2 parts of calcium chloride is dissolved in 30 parts of ion-exchanged water.

Example 27

A black toner (KT27) and a black developer (KD27) are obtained in the same manner as in Example 1 except that the magnesium chloride aqueous solution is changed to a calcium chloride aqueous solution in which 11.4 parts of calcium chloride is dissolved in 30 parts of ion-exchanged water.

Example 28

A black toner (KT28) and a black developer (KD28) are obtained in the same manner as in Example 1 except that the magnesium chloride aqueous solution is changed to a potassium chloride aqueous solution in which 8.3 parts of potassium chloride is dissolved in 30 parts of ion-exchanged water.

Example 29

A black toner (KT29) and a black developer (KD29) are obtained in the same manner as in Example 1 except that the magnesium chloride aqueous solution is changed to a potassium chloride aqueous solution in which 33.2 parts of potassium chloride is dissolved in 30 parts of ion-exchanged water.

Example 30

A black toner (KT30) and a black developer (KD30) are obtained in the same manner as in Example 1, except that when the external additive is externally added, fatty acid metal salt particle (F1) (zinc stearate particles (trade name: Zinc stearate GF-200, manufactured by NOF Corporation) is crushed by a mixer to have an average particle diameter of 2.4 μm) is also externally added together with the hydrophobic silica.

Example 31

A black toner (KT31) and a black developer (KD31) are obtained in the same manner as in Example 1, except that when the external additive is externally added, fatty acid metal salt particle (F2) (zinc stearate particles (trade name: Zinc stearate GF-200, manufactured by NOF Corporation) is crushed by a mixer to have an average particle diameter of 2.3 μm) is also externally added together with the hydrophobic silica.

Example 32

A black toner (KT32) and a black developer (KD32) are obtained in the same manner as in Example 1 except that the holding time in the second aggregated particle forming step is changed to 60 minutes.

Example 33

A black toner (KT33) and a black developer (KD33) are obtained in the same manner as in Example 1 except that the holding time in the second aggregated particle forming step is changed to 45 minutes.

Example 34

A black toner (KT34) and a black developer (KD34) are obtained in the same manner as in Example 1 except that the holding time in the second aggregated particle forming step is changed to 20 minutes.

Example 35

A black toner (KT35) and a black developer (KD35) are obtained in the same manner as in Example 1 except that the holding time in the second aggregated particle forming step is changed to 10 minutes.

Comparative Example 1

A black toner (KCT1) and a black developer (KCD1) are obtained in the same manner as in Example 1 except that the release agent particle dispersion liquid (W1) is changed to the release agent particle dispersion liquid (W2).

Comparative Example 2

A black toner (KCT2) and a black developer (KCD2) are obtained in the same manner as in Example 1 except that no release agent dispersion liquid is added.

Comparative Example 3

A black toner (KCT3) and a black developer (KCD3) are obtained in the same manner as in Example 1 except that the release agent particle dispersion liquid (W1) is changed to the release agent particle dispersion liquid (W5).

Comparative Example 4

A black toner (KCT4) and a black developer (KCD4) are obtained in the same manner as in Example 1 except that in the first aggregated particle forming step, the holding time is extended until the particle diameter of the aggregated particles becomes 4.7 μm, and in the second aggregated particle forming step, the amorphous polyester resin particle dispersion liquid (A1) and the crystalline polyester resin particle dispersion liquid (B1) are not added, and the pH is adjusted to 9.0 by using 1N of sodium hydroxide aqueous solution.

Comparative Example 5

A black toner (KCT5) and a black developer (KCD5) are obtained in the same manner as in Example 1 except that in the second aggregated particle forming step, the addition amounts of the amorphous polyester resin particle dispersion liquid (A1) and the crystalline polyester resin particle dispersion liquid (B1) added four times in total are changed to 78 parts and 39 parts, respectively.

[Measurement of Net Intensity of Each Element]

In the toner particle of each Example, the Net intensities of the following elements are measured according to the method described above. The results are shown in Table 1 and Table 2.

- Net intensity NA of the total of alkali metal element and alkaline earth metal element (denoted as "ALKALI ($N_A$)" in the table)
- Net intensity $N_N$ of Na element (denoted as "Na ($N_N$)" in the table)
- Net intensity $N_M$ of Mg element (denoted as "Mg ($N_M$)" in the table)
- Net intensity $N_C$ of Ca element (denoted as "Ca ($N_C$)" in the table)
- Total of a Net intensity $N_{A-NMC}$ of alkali metal element and alkaline earth metal element other than Na element, Mg element, and Ca element (denoted as "ALKALI−(Na+Mg+Ca) ($N_{A-NMC}$)" in the table)

<Offset Evaluation>

The developer set of each Example is stored in a developing device of a modified machine of DocuCentre Color 400 (manufactured by FUJIFILM Business Innovation Corp.). Using this modified machine, 10,000 sheets of images having an image density of 20% are output on A4 size J paper (manufactured by FUJIFILM Business Innovation Corp.) under an environment of 28° C. and 85% RH. The 10000 sheets of images are visually confirmed, and the presence or absence of offset is evaluated. The evaluation is performed according to the following evaluation criteria. A to C are set as allowable ranges.

—Evaluation Criteria—

A: No offset can be confirmed.
B: Offset is less than 1% of the image area.
C: Offset is 1% or more and less than 10% of the image area.
D: Offset is 10% or more and less than 15% of the image area.
E: Offset is more than 15% of the image area.

Abbreviations in the table are as follows.

St: styrene acrylic resin
Cry: crystalline polyester resin
Amo: amorphous polyester resin In the table, the "binder resin content (St/Cry/Amo)" indicates, with respect to the total toner particle, the content of the styrene acrylic resin, the content of the crystalline polyester resin, and the total content of the amorphous polyester resin of the core portion and the amorphous polyester resin of the coating layer.

In the table, the "ratio (%) of thickness of coating layer" indicates the ratio of the thickness of the coating layer to the maximum diameter of the toner particle.

In the table, the "particle diameter (μm)" of the toner particle indicates the volume average particle diameter of the toner particle.

TABLE 1

| | Toner particle | | | | | | | | | | |
|---|---|---|---|---|---|---|---|---|---|---|---|
| | Particle diameter (μm) | Lower GSDv | Kind of binder resin of core portion | Binder resin of coating layer | Binder resin content (St/Cry/Amo) | Ratio (%) of thickness of coating layer | Kind of release agent particle dispersion liquid | Melting temperature of release agent (° C.) | Number of domains of release agent | Content of colorant (%) |
| Example 1 | 4.7 | 1.23 | St, Cry, Amo | Amo | 82.0/15.0/3.0 | 10 | W1 | 79 | 2 | 8 |
| Example 2 | 4.7 | 1.23 | St, Cry, Amo | Amo | 82.0/15.0/3.0 | 10 | W3 | 79 | 1 | 8 |
| Example 3 | 4.7 | 1.23 | St, Cry, Amo | Amo | 82.0/15.0/3.0 | 10 | W4 | 79 | 3 | 8 |
| Example 4 | 4.7 | 1.23 | St, Cry, Amo | Amo | 82.0/15.0/3.0 | 1 | W1 | 79 | 2 | 8 |
| Example 5 | 4.7 | 1.23 | St, Cry, Amo | Amo | 82.0/15.0/3.0 | 25 | W1 | 79 | 2 | 8 |
| Example 6 | 4.7 | 1.23 | Cry, Amo | Amo | 0.0/15.0/85.0 | 10 | W1 | 79 | 2 | 8 |
| Example 7 | 4.7 | 1.23 | St, Cry, Amo | Amo | 49.0/15.0/36.0 | 10 | W1 | 79 | 2 | 8 |
| Example 8 | 4.7 | 1.23 | St, Cry, Amo | Amo | 82.0/15.0/3.0 | 10 | W1 | 79 | 2 | 4 |
| Example 9 | 4.7 | 1.23 | St, Cry, Amo | Amo | 82.0/15.0/3.0 | 10 | W1 | 79 | 2 | 5 |
| Example 10 | 4.7 | 1.23 | St, Cry, Amo | Amo | 82.0/15.0/3.0 | 10 | W1 | 79 | 2 | 12 |
| Example 11 | 4.7 | 1.23 | St, Cry, Amo | Amo | 82.0/15.0/3.0 | 10 | W1 | 79 | 2 | 13 |
| Example 12 | 4.7 | 1.23 | St, Cry, Amo | Amo | 82.0/15.0/3.0 | 10 | W1 | 79 | 2 | 8 |
| Example 13 | 4.7 | 1.23 | St, Cry, Amo | Amo | 82.0/15.0/3.0 | 10 | W1 | 79 | 2 | 8 |
| Example 14 | 4.7 | 1.23 | St, Cry, Amo | Amo | 82.0/15.0/3.0 | 10 | W1 | 79 | 2 | 8 |
| Example 15 | 4.7 | 1.23 | St, Cry, Amo | Amo | 82.0/15.0/3.0 | 10 | W1 | 79 | 2 | 8 |
| Example 16 | 4.7 | 1.23 | St, Cry, Amo | Amo | 82.0/15.0/3.0 | 10 | W1 | 79 | 2 | 8 |
| Example 17 | 4.7 | 1.23 | St, Cry, Amo | Amo | 82.0/15.0/3.0 | 10 | W1 | 79 | 2 | 8 |
| Example 18 | 4.7 | 1.23 | St, Cry, Amo | Amo | 82.0/15.0/3.0 | 10 | W1 | 79 | 2 | 8 |

| | Fatty acid metal salt particle | | Net intensity | | | | | |
|---|---|---|---|---|---|---|---|---|
| | Kind of fatty acid metal salt particle | Ratio (DT/DS) | ALKALI ($N_A$) | Na ($N_N$) | Mg ($N_M$) | Ca ($N_C$) | ALKALI - (Na + Mg + Ca) ($N_{A-NMC}$) | Offset Evaluation |
| Example 1 | None | — | 0.25 | 0.00 | 0.25 | 0.00 | 0.00 | A |
| Example 2 | None | — | 0.25 | 0.00 | 0.25 | 0.00 | 0.00 | A |
| Example 3 | None | — | 0.25 | 0.00 | 0.25 | 0.00 | 0.00 | A |
| Example 4 | None | — | 0.25 | 0.00 | 0.25 | 0.00 | 0.00 | A |
| Example 5 | None | — | 0.25 | 0.00 | 0.25 | 0.00 | 0.00 | A |
| Example 6 | None | — | 0.25 | 0.00 | 0.25 | 0.00 | 0.00 | B |
| Example 7 | None | — | 0.25 | 0.00 | 0.25 | 0.00 | 0.00 | C |
| Example 8 | None | — | 0.25 | 0.00 | 0.25 | 0.00 | 0.00 | C |
| Example 9 | None | — | 0.25 | 0.00 | 0.25 | 0.00 | 0.00 | B |
| Example 10 | None | — | 0.25 | 0.00 | 0.25 | 0.00 | 0.00 | B |
| Example 11 | None | — | 0.25 | 0.00 | 0.25 | 0.00 | 0.00 | C |
| Example 12 | None | — | 0.06 | 0.02 | 0.02 | 0.02 | 0.00 | C |
| Example 13 | None | — | 0.10 | 0.02 | 0.02 | 0.02 | 0.04 | C |
| Example 14 | None | — | 0.40 | 0.02 | 0.02 | 0.02 | 0.34 | C |
| Example 15 | None | — | 0.50 | 0.02 | 0.02 | 0.02 | 0.44 | C |
| Example 16 | None | — | 0.09 | 0.09 | 0.00 | 0.00 | 0.00 | C |
| Example 17 | None | — | 0.10 | 0.10 | 0.00 | 0.00 | 0.00 | B |
| Example 18 | None | — | 0.40 | 0.40 | 0.00 | 0.00 | 0.00 | B |

TABLE 2

| | Toner particle | | | | | | | | | |
|---|---|---|---|---|---|---|---|---|---|---|
| | Particle diameter (μm) | Lower GSDv | Kind of binder resin of core portion | Binder resin of coating layer | Binder resin content (St/Cry/Amo) | Ratio (%) of thickness of coating layer | Kind of release agent particle dispersion liquid | Melting temperature of release agent (° C.) | Number of domains of release agent | Content of colorant (%) |
| Example 19 | 4.7 | 1.23 | St, Cry, Amo | Amo | 82.0/15.0/3.0 | 10 | W1 | 79 | 2 | 8 |
| Example 20 | 4.7 | 1.23 | St, Cry, Amo | Amo | 82.0/15.0/3.0 | 10 | W1 | 79 | 2 | 8 |
| Example 21 | 4.7 | 1.23 | St, Cry, Amo | Amo | 82.0/15.0/3.0 | 10 | W1 | 79 | 2 | 8 |
| Example 22 | 4.7 | 1.23 | St, Cry, Amo | Amo | 82.0/15.0/3.0 | 10 | W1 | 79 | 2 | 8 |
| Example 23 | 4.7 | 1.23 | St, Cry, Amo | Amo | 82.0/15.0/3.0 | 10 | W1 | 79 | 2 | 8 |
| Example 24 | 4.7 | 1.23 | St, Cry, Amo | Amo | 82.0/15.0/3.0 | 10 | W1 | 79 | 2 | 8 |
| Example 25 | 4.7 | 1.23 | St, Cry, Amo | Amo | 82.0/15.0/3.0 | 10 | W1 | 79 | 2 | 8 |
| Example 26 | 4.7 | 1.23 | St, Cry, Amo | Amo | 82.0/15.0/3.0 | 10 | W1 | 79 | 2 | 8 |
| Example 27 | 4.7 | 1.23 | St, Cry, Amo | Amo | 82.0/15.0/3.0 | 10 | W1 | 79 | 2 | 8 |
| Example 28 | 4.7 | 1.23 | St, Cry, Amo | Amo | 82.0/15.0/3.0 | 10 | W1 | 79 | 2 | 8 |
| Example 29 | 4.7 | 1.23 | St, Cry, Amo | Amo | 82.0/15.0/3.0 | 10 | W1 | 79 | 2 | 8 |
| Example 30 | 4.7 | 1.23 | St, Cry, Amo | Amo | 82.0/15.0/3.0 | 10 | W1 | 79 | 2 | 8 |
| Example 31 | 4.7 | 1.23 | St, Cry, Amo | Amo | 82.0/15.0/3.0 | 10 | W1 | 79 | 2 | 8 |
| Example 32 | 4.7 | 1.14 | St, Cry, Amo | Amo | 82.0/15.0/3.0 | 10 | W1 | 79 | 2 | 8 |

TABLE 2-continued

| | | | | | | | | | | |
|---|---|---|---|---|---|---|---|---|---|---|
| Example 33 | 4.7 | 1.15 | St, Cry, Amo | Amo | 82.0/15.0/3.0 | 10 | W1 | 79 | 2 | 8 |
| Example 34 | 4.7 | 1.30 | St, Cry, Amo | Amo | 82.0/15.0/3.0 | 10 | W1 | 79 | 2 | 8 |
| Example 35 | 4.7 | 1.31 | St, Cry, Amo | Amo | 82.0/15.0/3.0 | 10 | W1 | 79 | 2 | 8 |
| Comparative Example 1 | 4.7 | 1.23 | St, Cry, Amo | Amo | 82.0/15.0/3.0 | 10 | W2 | 82 | 2 | 8 |
| Comparative Example 2 | 4.7 | 1.23 | St, Cry, Amo | Amo | 82.0/15.0/3.0 | 10 | — | — | 0 | 8 |
| Comparative Example 3 | 4.7 | 1.23 | St, Cry, Amo | Amo | 82.0/15.0/3.0 | 10 | W5 | 79 | 4 | 8 |
| Comparative Example 4 | 4.7 | 1.23 | St, Cry, Amo | — | 82.0/15.0/3.0 | 0 | W1 | 79 | 2 | 8 |
| Comparative Example 5 | 4.7 | 1.23 | St, Cry, Amo | Amo | 82.0/15.0/3.0 | 26 | W1 | 79 | 2 | 8 |

| | Fatty acid metal salt particle | | Net intensity | | | | | |
|---|---|---|---|---|---|---|---|---|
| | Kind of fatty acid metal salt particle | Ratio (DT/DS) | ALKALI ($N_A$) | Na ($N_N$) | Mg ($N_M$) | Ca ($N_C$) | ALKALI - (Na + Mg + Ca) ($N_{A-NMC}$) | Offset Evaluation |
| Example 19 | None | — | 0.41 | 0.41 | 0.00 | 0.00 | 0.00 | C |
| Example 20 | None | — | 0.93 | 0.00 | 0.93 | 0.00 | 0.00 | C |
| Example 21 | None | — | 0.10 | 0.00 | 0.10 | 0.00 | 0.00 | A |
| Example 22 | None | — | 0.40 | 0.00 | 0.40 | 0.00 | 0.00 | A |
| Example 23 | None | — | 0.41 | 0.00 | 0.41 | 0.00 | 0.00 | C |
| Example 24 | None | — | 0.09 | 0.00 | 0.00 | 0.09 | 0.00 | C |
| Example 25 | None | — | 0.10 | 0.00 | 0.00 | 0.10 | 0.00 | B |
| Example 26 | None | — | 0.40 | 0.00 | 0.00 | 0.40 | 0.00 | B |
| Example 27 | None | — | 0.41 | 0.00 | 0.00 | 0.41 | 0.00 | C |
| Example 28 | None | — | 0.10 | 0.00 | 0.00 | 0.00 | 0.10 | C |
| Example 29 | None | — | 0.40 | 0.00 | 0.00 | 0.00 | 0.40 | C |
| Example 30 | F1 | 1.9 | 0.25 | 0.00 | 0.25 | 0.00 | 0.00 | B |
| Example 31 | F2 | 2.0 | 0.25 | 0.00 | 0.25 | 0.00 | 0.00 | A |
| Example 32 | None | — | 0.25 | 0.00 | 0.25 | 0.00 | 0.00 | C |
| Example 33 | None | — | 0.25 | 0.00 | 0.25 | 0.00 | 0.00 | B |
| Example 34 | None | — | 0.25 | 0.00 | 0.25 | 0.00 | 0.00 | B |
| Example 35 | None | — | 0.25 | 0.00 | 0.25 | 0.00 | 0.00 | C |
| Comparative Example 1 | None | — | 0.25 | 0.00 | 0.25 | 0.00 | 0.00 | D |
| Comparative Example 2 | None | — | 0.25 | 0.00 | 0.25 | 0.00 | 0.00 | E |
| Comparative Example 3 | None | — | 0.25 | 0.00 | 0.25 | 0.00 | 0.00 | D |
| Comparative Example 4 | None | — | 0.25 | 0.00 | 0.25 | 0.00 | 0.00 | D |
| Comparative Example 5 | None | — | 0.25 | 0.00 | 0.25 | 0.00 | 0.00 | E |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing toner comprising:

a toner particle including a core portion containing a binder resin and a release agent that has a melting temperature Tm of 80° C. or less, and a coating layer that coats the core portion and contains an amorphous polyester resin, wherein the toner particle has a cross section in which one or more and three or less domains of the release agent are present in the core portion, the one or more and three or less domains having a circle-equivalent diameter of 1 μm or more and 3 μm or less, the toner particle has a volume average particle diameter of 4.2 μm or more and 5.8 μm or less, and a ratio of a thickness of the coating layer to a maximum diameter of the toner particle is 1% or more and 25% or less in the cross section.

2. The electrostatic charge image developing toner according to claim 1, wherein the binder resin contains a styrene acrylic resin, a crystalline polyester resin, and an amorphous polyester resin.

3. The electrostatic charge image developing toner according to claim 2, wherein with respect to the total toner particle, the styrene acrylic resin is contained in 50 mass % or more and 90 mass % or less, with respect to the total toner particle, the crystalline polyester resin is contained in 9.5 mass % or more and 40 mass % or less, and with respect to the total toner particle, the amorphous polyester resin of the core portion and the coating layer is contained in 0.5 mass % or more and 5 mass % or less in total.

4. The electrostatic charge image developing toner according to claim 3, wherein the toner particle contains a colorant of 5 mass % or more and 12 mass % or less with respect to the total toner particle.

5. The electrostatic charge image developing toner according to claim 4, wherein a total of a Net intensity $N_A$ of an alkali metal element and an alkaline earth metal element in the toner particle measured by fluorescence X-ray analysis is 0.10 kcps or more and 0.40 kcps or less.

6. The electrostatic charge image developing toner according to claim 3, wherein a total of a Net intensity $N_A$ of an alkali metal element and an alkaline earth metal element in the toner particle measured by fluorescence X-ray analysis is 0.10 kcps or more and 0.40 kcps or less.

7. The electrostatic charge image developing toner according to claim 2, wherein the toner particle contains a colorant of 5 mass % or more and 12 mass % or less with respect to the total toner particle.

8. The electrostatic charge image developing toner according to claim 7, wherein a total of a Net intensity $N_A$ of an alkali metal element and an alkaline earth metal element in the toner particle measured by fluorescence X-ray analysis is 0.10 kcps or more and 0.40 kcps or less.

9. The electrostatic charge image developing toner according to claim 2, wherein a total of a Net intensity $N_A$ of an alkali metal element and an alkaline earth metal element in the toner particle measured by fluorescence X-ray analysis is 0.10 kcps or more and 0.40 kcps or less.

10. The electrostatic charge image developing toner according to claim 1, wherein the toner particle contains a colorant of 5 mass % or more and 12 mass % or less with respect to the total toner particle.

11. The electrostatic charge image developing toner according to claim 10, wherein a total of a Net intensity $N_A$ of an alkali metal element and an alkaline earth metal element in the toner particle measured by fluorescence X-ray analysis is 0.10 kcps or more and 0.40 kcps or less.

12. The electrostatic charge image developing toner according to claim 1, wherein a total of a Net intensity $N_A$ of an alkali metal element and an alkaline earth metal element in the toner particle measured by fluorescence X-ray analysis is 0.10 kcps or more and 0.40 kcps or less.

13. The electrostatic charge image developing toner according to claim 12, wherein the Net intensity $N_A$ is a Net intensity $N_N$ of Na element, a Net intensity $N_M$ of Mg element, or a Net intensity $N_C$ of Ca element in which the Net intensity $N_N$, the Net intensity $N_M$, and the Net intensity $N_C$ are measured by fluorescence X-ray analysis.

14. The electrostatic charge image developing toner according to claim 12, wherein the Net intensity $N_A$ is a Net intensity $N_M$ of Mg element measured by fluorescence X-ray analysis.

15. The electrostatic charge image developing toner according to claim 1, further comprising:

an external additive containing a fatty acid metal salt particle, wherein a ratio (DT/DS) of a volume average particle diameter DT of the toner particle to a volume average particle diameter DS of the fatty acid metal salt particle is 1.9 or more.

16. The electrostatic charge image developing toner according to claim 1, wherein a volume particle size distribution index at a small diameter side of the toner particle is 1.15 or more and 1.30 or less.

17. An electrostatic charge image developer comprising the electrostatic charge image developing toner according to claim 1.

18. A process cartridge configured to be attached to and detached from an image forming apparatus, the process cartridge comprising:

a developing unit that stores the electrostatic charge image developer according to claim 17, and is configured to develop an electrostatic charge image as a toner image by the electrostatic charge image developer, the electrostatic charge image being formed on a surface of an image carrier.

19. An image forming apparatus comprising:

an image carrier;

a charging unit configured to charge a surface of the image carrier;

an electrostatic charge image forming unit configured to form an electrostatic charge image on the surface of the image carrier charged;

a developing unit that stores the electrostatic charge image developer according to claim 17, and is configured to develop the electrostatic charge image as a toner image by the electrostatic charge image developer;

a transfer unit configured to transfer the toner image formed on the surface of the image carrier to a surface of a recording medium; and a fixing unit configured to fix the toner image transferred to the surface of the recording medium.

20. A toner cartridge that stores the electrostatic charge image developing toner according to claim 1 and is configured to be attached to and detached from an image forming apparatus.

* * * * *